US 11,809,631 B2

(12) United States Patent
Chen et al.

(10) Patent No.: US 11,809,631 B2
(45) Date of Patent: Nov. 7, 2023

(54) RELUCTANCE HAPTIC ENGINE FOR AN ELECTRONIC DEVICE

(71) Applicant: Apple Inc., Cupertino, CA (US)

(72) Inventors: Denis G. Chen, San Jose, CA (US); Timothy D. Koch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/855,236

(22) Filed: Jun. 30, 2022

(65) Prior Publication Data

US 2023/0094873 A1    Mar. 30, 2023

Related U.S. Application Data

(60) Provisional application No. 63/246,432, filed on Sep. 21, 2021.

(51) Int. Cl.
  *G06F 3/041*    (2006.01)
  *G06F 3/01*    (2006.01)
  *G06F 3/0354*    (2013.01)

(52) U.S. Cl.
  CPC ............ *G06F 3/016* (2013.01); *G06F 3/03547* (2013.01); *G06F 2203/0339* (2013.01)

(58) Field of Classification Search
  CPC ................. G06F 3/016; G06F 3/03547; G06F 2203/0339; H02P 25/08
  See application file for complete search history.

(56) References Cited

U.S. PATENT DOCUMENTS

| | | |
|---|---|---|
| 3,001,049 A | 9/1961 | Didier |
| 3,390,287 A | 6/1968 | Sonderegger |
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland et al. |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |

(Continued)

FOREIGN PATENT DOCUMENTS

| | | |
|---|---|---|
| AU | 2015100710 A4 | 7/2015 |
| AU | 2016100399 A4 | 5/2016 |
| CA | 2355434 A1 | 2/2002 |

(Continued)

OTHER PUBLICATIONS

Actuator definition downloaded from http://www.thefreedictionary.com/actuator on May 3, 2018, 2 pages.

(Continued)

*Primary Examiner* — Joe H Cheng
(74) *Attorney, Agent, or Firm* — Brownstein Hyatt Farber Schreck, LLP

(57) ABSTRACT

A reluctance haptic engine for an electronic device includes a core, an attractor plate, and mechanical suspension. The core and/or the attractor plate may be coupled to an input structure, such as a button cap, a trackpad cover, or a touchscreen cover. In an unactuated configuration, flexible support members maintain a gap between the core and the attractor plate. An electrical current may be applied to one or more conduction loops of the core to actuate the reluctance haptic engine and provide a haptic output by moving the input structure. The electrical current may cause a magnetic flux that results in a reluctance force that pulls the attractor and the core together and causes the input structure to move to produce a haptic output.

20 Claims, 14 Drawing Sheets

(56) References Cited

U.S. PATENT DOCUMENTS

| | | |
|---|---|---|
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,035,257 A | 3/2000 | Epperson |
| 6,069,433 A | 5/2000 | Lazarus et al. |
| 6,078,308 A | 6/2000 | Rosenberg et al. |
| 6,104,947 A | 8/2000 | Heikkilä et al. |
| 6,127,756 A | 10/2000 | Iwaki et al. |
| 6,135,886 A | 10/2000 | Armstrong |
| 6,198,206 B1 | 3/2001 | Saarmaa et al. |
| 6,218,966 B1 | 4/2001 | Goodwin et al. |
| 6,219,033 B1 | 4/2001 | Rosenberg et al. |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B1 | 1/2002 | Rosenberg et al. |
| 6,351,205 B1 | 2/2002 | Armstrong |
| 6,373,465 B1 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An et al. |
| 6,437,485 B1 | 8/2002 | Johansson |
| 6,438,393 B1 | 8/2002 | Suuronen |
| 6,444,928 B2 | 9/2002 | Okamoto et al. |
| 6,455,973 B1 | 9/2002 | Ineson et al. |
| 6,465,921 B1 | 10/2002 | Horng et al. |
| 6,552,404 B1 | 4/2003 | Hynes et al. |
| 6,552,471 B1 | 4/2003 | Chandran et al. |
| 6,557,072 B2 | 4/2003 | Osborn |
| 6,642,857 B1 | 11/2003 | Schediwy et al. |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis, III |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Haparnas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis, III |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis, III |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis, III |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha et al. |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yajima et al. |
| 8,174,372 B2 | 5/2012 | da Costa |
| 8,179,027 B2 | 5/2012 | Strittmatter et al. |
| 8,179,202 B2 | 5/2012 | Cruz-Hernandez et al. |

(56) References Cited

U.S. PATENT DOCUMENTS

| | | |
|---|---|---|
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae et al. |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis, III |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,388,346 B2 | 3/2013 | Rantala et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura et al. |
| 8,575,794 B2 | 11/2013 | Lee et al. |
| 8,587,955 B2 | 11/2013 | DiFonzo et al. |
| 8,593,409 B1 | 11/2013 | Heubel et al. |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian et al. |
| 8,681,092 B2 | 3/2014 | Harada et al. |
| 8,682,396 B2 | 3/2014 | Yang et al. |
| 8,686,952 B2 | 4/2014 | Burrough et al. |
| 8,710,966 B2 | 4/2014 | Hill |
| 8,717,309 B2 | 5/2014 | Almalki |
| 8,723,813 B2 | 5/2014 | Park et al. |
| 8,733,540 B2 | 5/2014 | Woiler et al. |
| 8,735,755 B2 | 5/2014 | Peterson et al. |
| 8,760,273 B2 | 6/2014 | Casparian et al. |
| 8,760,413 B2 | 6/2014 | Peterson et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,984 B2 | 8/2015 | Heubel |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Burrough et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann et al. |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg et al. |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,448,713 B2 | 9/2016 | Cruz-Hernandez et al. |
| 9,449,476 B2 | 9/2016 | Lynn et al. |
| 9,452,268 B2 | 9/2016 | Zivkovic et al. |
| 9,454,239 B2 | 9/2016 | Elias |
| 9,467,033 B2 | 10/2016 | Jun et al. |
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Salu et al. |
| 9,501,912 B1 | 11/2016 | Havskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez et al. |
| 9,594,450 B2 | 3/2017 | Lynn et al. |
| 9,595,659 B2 | 3/2017 | Kim |
| 9,600,070 B2 | 3/2017 | Chatterjee et al. |
| 9,608,506 B2 | 3/2017 | Degner et al. |
| 9,622,214 B2 | 4/2017 | Ryu et al. |
| 9,640,048 B2 | 5/2017 | Hill |

(56) References Cited

U.S. PATENT DOCUMENTS

| | | | |
|---|---|---|---|
| 9,652,040 B2 | 5/2017 | Martinez et al. |
| 9,659,482 B2 | 5/2017 | Yang et al. |
| 9,665,198 B2 | 5/2017 | Kies et al. |
| 9,692,286 B2 | 6/2017 | Endo et al. |
| 9,696,803 B2 | 7/2017 | Cruz-Hernandez et al. |
| 9,727,157 B2 | 8/2017 | Ham et al. |
| 9,733,704 B2 | 8/2017 | Cruz-Hernandez et al. |
| 9,746,945 B2 | 8/2017 | Sheynblat et al. |
| 9,778,743 B2 | 10/2017 | Grant et al. |
| 9,779,592 B1 | 10/2017 | Hoen |
| 9,785,251 B2 | 10/2017 | Martisauskas |
| 9,823,833 B2 | 11/2017 | Grant et al. |
| 9,830,782 B2 | 11/2017 | Morrell et al. |
| 9,831,871 B2 | 11/2017 | Lee et al. |
| 9,836,123 B2 | 12/2017 | Gipson et al. |
| 9,846,484 B2 | 12/2017 | Shah |
| 9,857,872 B2 | 1/2018 | Terlizzi et al. |
| 9,870,053 B2 | 1/2018 | Modarres et al. |
| 9,886,093 B2 | 2/2018 | Moussette et al. |
| 9,891,708 B2 | 2/2018 | Cruz-Hernandez et al. |
| 9,904,393 B2 | 2/2018 | Frey et al. |
| 9,911,553 B2 | 3/2018 | Bernstein |
| 9,928,950 B2 | 3/2018 | Lubinski et al. |
| 9,934,661 B2 | 4/2018 | Hill |
| 9,970,757 B2 | 5/2018 | Das et al. |
| 9,990,099 B2 | 6/2018 | Ham et al. |
| 9,997,306 B2 | 6/2018 | Bernstein |
| 10,013,058 B2 | 7/2018 | Puskarich et al. |
| 10,032,550 B1 | 7/2018 | Zhang et al. |
| 10,038,361 B2 | 7/2018 | Hajati et al. |
| 10,039,080 B2 | 7/2018 | Miller et al. |
| 10,061,386 B2 | 8/2018 | Frescas et al. |
| 10,062,832 B2 | 8/2018 | Caraveo et al. |
| 10,067,585 B2 | 9/2018 | Kim et al. |
| 10,069,392 B2 | 9/2018 | Degner et al. |
| 10,108,151 B2 | 10/2018 | Cardinali et al. |
| 10,108,265 B2 | 10/2018 | Harley et al. |
| 10,120,446 B2 | 11/2018 | Pance et al. |
| 10,126,817 B2 | 11/2018 | Morrell et al. |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,152,116 B2 | 12/2018 | Wang et al. |
| 10,198,097 B2 | 2/2019 | Lynn et al. |
| 10,204,494 B2 | 2/2019 | Do et al. |
| 10,236,760 B2 | 3/2019 | Moussette et al. |
| 10,268,272 B2 | 4/2019 | Chen |
| 10,276,001 B2 | 4/2019 | Smith, IV et al. |
| 10,289,199 B2 | 5/2019 | Hoellwarth |
| 10,338,682 B2 | 7/2019 | Heubel et al. |
| 10,345,905 B2 | 7/2019 | McClure et al. |
| 10,353,382 B2 | 7/2019 | Bodenstein |
| 10,353,467 B2 | 7/2019 | Augenbergs et al. |
| 10,367,950 B2 | 7/2019 | Davis et al. |
| 10,372,250 B2 | 8/2019 | Zhang et al. |
| 10,416,811 B2 | 9/2019 | Abdollahian et al. |
| 10,423,214 B2 | 9/2019 | Mistry et al. |
| 10,429,929 B2 | 10/2019 | Sulem et al. |
| 10,436,607 B2 | 10/2019 | Chen et al. |
| 10,444,834 B2 | 10/2019 | Vescovi et al. |
| 10,444,841 B2 | 10/2019 | Nakamura et al. |
| 10,456,622 B2 | 10/2019 | Szabados et al. |
| 10,459,521 B2 | 10/2019 | Puskarich |
| 10,475,300 B2 | 11/2019 | Hill |
| 10,481,691 B2 | 11/2019 | Uttermann et al. |
| 10,481,692 B2 | 11/2019 | Ullrich et al. |
| 10,488,927 B2 | 11/2019 | Lim et al. |
| 10,490,035 B2 | 11/2019 | Morrell et al. |
| 10,503,255 B2 | 12/2019 | Ramstein et al. |
| 10,504,339 B2 | 12/2019 | Birnbaum et al. |
| 10,514,761 B2 | 12/2019 | Rihn et al. |
| 10,540,043 B2 | 1/2020 | Tanemura et al. |
| 10,545,604 B2 | 1/2020 | Bijamov et al. |
| 10,564,721 B2 | 2/2020 | Cruz-Hernandez et al. |
| 10,566,888 B2 | 2/2020 | Degner et al. |
| 10,585,480 B1* | 3/2020 | Bushnell et al. ...... G06F 3/0202 |
| 10,608,162 B2 | 3/2020 | Noguchi |
| 10,609,677 B2 | 3/2020 | Miller et al. |
| 10,622,538 B2 | 4/2020 | Zhang et al. |
| 10,651,716 B2 | 5/2020 | Moussette et al. |
| 10,762,752 B1* | 9/2020 | Persson et al. ......... H04R 1/02 |
| 10,788,932 B2 | 9/2020 | Iuchi et al. |
| 10,809,805 B2 | 10/2020 | Chen |
| 10,890,973 B2 | 1/2021 | Hajati |
| 10,976,824 B1* | 4/2021 | Amin-Shahidi et al. ................... G06F 3/0338 |
| 11,043,088 B2 | 6/2021 | Hill |
| 11,165,382 B2 | 11/2021 | Creary et al. |
| 11,380,470 B2 | 7/2022 | Amin-Shahidi et al. |
| 11,402,911 B2 | 8/2022 | Uttermann et al. |
| 2002/0194284 A1 | 12/2002 | Haynes |
| 2003/0210259 A1 | 11/2003 | Liu et al. |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis, III |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao et al. |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson et al. |
| 2008/0181501 A1 | 7/2008 | Faraboschi et al. |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0291670 A1 | 11/2009 | Sennett et al. |
| 2010/0020036 A1 | 1/2010 | Hui et al. |
| 2010/0053087 A1 | 3/2010 | Dai et al. |
| 2010/0089735 A1 | 4/2010 | Takeda et al. |
| 2010/0110018 A1 | 5/2010 | Faubert et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0265197 A1 | 10/2010 | Purdy et al. |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0156539 A1 | 6/2011 | Park et al. |
| 2011/0157052 A1 | 6/2011 | Lee et al. |
| 2011/0163985 A1 | 7/2011 | Bae et al. |
| 2011/0216013 A1 | 9/2011 | Siotis |
| 2011/0248948 A1 | 10/2011 | Griffin et al. |
| 2011/0260988 A1 | 10/2011 | Colgate et al. |

(56) References Cited

U.S. PATENT DOCUMENTS

| | | | |
|---|---|---|---|
| 2011/0263200 A1 | 10/2011 | Thornton et al. | |
| 2011/0291950 A1 | 12/2011 | Tong | |
| 2011/0304559 A1 | 12/2011 | Pasquero | |
| 2012/0092263 A1 | 4/2012 | Peterson et al. | |
| 2012/0126959 A1 | 5/2012 | Zarrabi et al. | |
| 2012/0133494 A1 | 5/2012 | Cruz-Hernandez et al. | |
| 2012/0206248 A1 | 8/2012 | Biggs | |
| 2012/0256848 A1 | 10/2012 | Madabusi Srinivasan | |
| 2012/0274578 A1 | 11/2012 | Snow et al. | |
| 2012/0280927 A1 | 11/2012 | Ludwig | |
| 2012/0319987 A1 | 12/2012 | Woo | |
| 2012/0327006 A1 | 12/2012 | Israr et al. | |
| 2013/0027345 A1 | 1/2013 | Binzel | |
| 2013/0033967 A1 | 2/2013 | Chuang et al. | |
| 2013/0043987 A1 | 2/2013 | Kasama et al. | |
| 2013/0058816 A1 | 3/2013 | Kim | |
| 2013/0106699 A1 | 5/2013 | Babatunde | |
| 2013/0191741 A1 | 7/2013 | Dickinson et al. | |
| 2013/0207793 A1 | 8/2013 | Weaber et al. | |
| 2013/0217491 A1 | 8/2013 | Hilbert et al. | |
| 2013/0257776 A1* | 10/2013 | Tissot | H02K 33/16 345/173 |
| 2013/0261811 A1 | 10/2013 | Yagi et al. | |
| 2013/0300590 A1 | 11/2013 | Dietz et al. | |
| 2014/0082490 A1 | 3/2014 | Jung et al. | |
| 2014/0085065 A1 | 3/2014 | Biggs et al. | |
| 2014/0132528 A1 | 5/2014 | Catton | |
| 2014/0168153 A1 | 6/2014 | Deichmann et al. | |
| 2014/0197936 A1 | 7/2014 | Biggs et al. | |
| 2014/0267076 A1 | 9/2014 | Birnbaum et al. | |
| 2015/0005039 A1 | 1/2015 | Liu et al. | |
| 2015/0040005 A1 | 2/2015 | Faaborg et al. | |
| 2015/0098309 A1 | 4/2015 | Adams et al. | |
| 2015/0169059 A1 | 6/2015 | Behles et al. | |
| 2015/0194165 A1 | 7/2015 | Faaborg et al. | |
| 2015/0205355 A1 | 7/2015 | Yairi | |
| 2015/0205417 A1 | 7/2015 | Yairi et al. | |
| 2015/0296480 A1 | 10/2015 | Kinsey et al. | |
| 2016/0103544 A1 | 4/2016 | Filiz et al. | |
| 2016/0241119 A1 | 8/2016 | Keeler | |
| 2017/0153703 A1 | 6/2017 | Yun et al. | |
| 2017/0311282 A1 | 10/2017 | Miller et al. | |
| 2017/0357325 A1 | 12/2017 | Yang et al. | |
| 2017/0364158 A1 | 12/2017 | Wen et al. | |
| 2018/0060941 A1 | 3/2018 | Yang et al. | |
| 2018/0081441 A1 | 3/2018 | Pedder et al. | |
| 2018/0090253 A1 | 3/2018 | Songatikamas et al. | |
| 2018/0302881 A1 | 10/2018 | Miller et al. | |
| 2020/0004337 A1* | 1/2020 | Hendren et al. | G06F 1/1616 |
| 2020/0103968 A1* | 4/2020 | Amin-Shahidi et al. | G06F 3/016 |
| 2020/0233495 A1* | 7/2020 | Bushnell et al. | G06F 3/0202 |
| 2021/0090773 A1* | 3/2021 | Amin-Shahidi et al. | G06F 3/016 |
| 2021/0312771 A1 | 10/2021 | Hill | |
| 2022/0291746 A1 | 9/2022 | Tarelli et al. | |
| 2022/0336132 A1 | 10/2022 | Amin-Shahidi et al. | |

FOREIGN PATENT DOCUMENTS

| | | | |
|---|---|---|---|
| CN | 1324030 A | 11/2001 | |
| CN | 1692371 A | 11/2005 | |
| CN | 1817321 A | 8/2006 | |
| CN | 101120290 A | 2/2008 | |
| CN | 101409164 A | 4/2009 | |
| CN | 101763192 A | 6/2010 | |
| CN | 101903848 A | 12/2010 | |
| CN | 101938207 A | 1/2011 | |
| CN | 102025257 A | 4/2011 | |
| CN | 102057656 A | 5/2011 | |
| CN | 201829004 U | 5/2011 | |
| CN | 102163076 A | 8/2011 | |
| CN | 102246122 A | 11/2011 | |
| CN | 102315747 A | 1/2012 | |
| CN | 102591512 A | 7/2012 | |
| CN | 102667681 A | 9/2012 | |
| CN | 102713805 A | 10/2012 | |
| CN | 102754054 A | 10/2012 | |
| CN | 102768593 A | 11/2012 | |
| CN | 102844972 A | 12/2012 | |
| CN | 102915111 A | 2/2013 | |
| CN | 103019569 A | 4/2013 | |
| CN | 103154867 A | 6/2013 | |
| CN | 103155410 A | 6/2013 | |
| CN | 103181090 A | 6/2013 | |
| CN | 103218104 A | 7/2013 | |
| CN | 103278173 A | 9/2013 | |
| CN | 103416043 A | 11/2013 | |
| CN | 103440076 A | 12/2013 | |
| CN | 103567135 A | 2/2014 | |
| CN | 103970339 A | 8/2014 | |
| CN | 104049746 A | 9/2014 | |
| CN | 104220963 A | 12/2014 | |
| CN | 104917885 A | 9/2015 | |
| CN | 104956244 A | 9/2015 | |
| CN | 105556268 A | 5/2016 | |
| CN | 208013890 U | 10/2018 | |
| DE | 19517630 A1 | 11/1996 | |
| DE | 10330024 A1 | 1/2005 | |
| DE | 102008027720 A1 | 12/2009 | |
| DE | 102009038103 A1 | 2/2011 | |
| DE | 102011115762 A1 | 4/2013 | |
| EP | 0483955 A1 | 5/1992 | |
| EP | 1047258 A2 | 10/2000 | |
| EP | 1686776 A1 | 8/2006 | |
| EP | 2060967 A1 | 5/2009 | |
| EP | 2073099 A2 | 6/2009 | |
| EP | 2194444 A2 | 6/2010 | |
| EP | 2207080 A1 | 7/2010 | |
| EP | 2264562 A2 | 12/2010 | |
| EP | 2315186 A2 | 4/2011 | |
| EP | 2374430 A1 | 10/2011 | |
| EP | 2395414 A1 | 12/2011 | |
| EP | 2461228 A2 | 6/2012 | |
| EP | 2631746 A1 | 8/2013 | |
| EP | 2434555 B1 | 10/2013 | |
| EP | 2148339 B1 | 7/2015 | |
| JP | H05301342 A2 | 11/1993 | |
| JP | 2001095290 A | 4/2001 | |
| JP | 2002102799 A | 4/2002 | |
| JP | 2002199689 A | 7/2002 | |
| JP | 200362525 | 3/2003 | |
| JP | 2003527046 A | 9/2003 | |
| JP | 200494389 A | 3/2004 | |
| JP | 2004236202 A | 8/2004 | |
| JP | 2006150865 A | 6/2006 | |
| JP | 3831410 B2 | 10/2006 | |
| JP | 2007519099 A | 7/2007 | |
| JP | 2008018928 | 1/2008 | |
| JP | 2010536040 A | 11/2010 | |
| JP | 2010272903 A | 12/2010 | |
| JP | 2011523840 A | 8/2011 | |
| JP | 2012135755 A | 7/2012 | |
| JP | 2013149124 A | 8/2013 | |
| JP | 2014002729 A | 1/2014 | |
| JP | 2014509028 A | 4/2014 | |
| JP | 2014235133 A | 12/2014 | |
| JP | 2014239323 A | 12/2014 | |
| JP | 2015153406 A | 8/2015 | |
| JP | 2015228214 A | 12/2015 | |
| JP | 2016095552 A | 5/2016 | |
| KR | 20050033909 A | 4/2005 | |
| KR | 1020100046602 B1 | 5/2010 | |
| KR | 1020110101516 A | 9/2011 | |
| KR | 20130024420 A | 3/2013 | |
| TW | 200518000 A | 6/2005 | |
| TW | 200951944 A1 | 12/2009 | |
| TW | 201145336 A1 | 12/2011 | |
| TW | 201218039 A1 | 5/2012 | |
| TW | 201425180 A | 7/2014 | |
| WO | 97/016932 A1 | 5/1997 | |
| WO | 00/051190 A1 | 8/2000 | |
| WO | 01/059558 A1 | 8/2001 | |
| WO | 01/089003 A1 | 11/2001 | |
| WO | 02/073587 A1 | 9/2002 | |
| WO | 03/038800 A1 | 5/2003 | |
| WO | 03/100550 | 12/2003 | |
| WO | 06/057770 | 6/2006 | |
| WO | 07/114631 | 10/2007 | |
| WO | 08/075082 A1 | 6/2008 | |

(56) References Cited

FOREIGN PATENT DOCUMENTS

| WO | 09/038862 | A1 | 3/2009 |
|---|---|---|---|
| WO | 09/068986 | A1 | 6/2009 |
| WO | 09/097866 | A1 | 8/2009 |
| WO | 09/122331 | | 10/2009 |
| WO | 09/150287 | A1 | 12/2009 |
| WO | 10/085575 | A1 | 7/2010 |
| WO | 10/087925 | | 8/2010 |
| WO | 11/007263 | A1 | 1/2011 |
| WO | 12/052635 | | 4/2012 |
| WO | 12/129247 | | 9/2012 |
| WO | 13/069148 | A1 | 5/2013 |
| WO | 13/150667 | A1 | 10/2013 |
| WO | 13/169299 | A1 | 11/2013 |
| WO | 13/169302 | A1 | 11/2013 |
| WO | 13/173838 | A2 | 11/2013 |
| WO | 13/186846 | A1 | 12/2013 |
| WO | 13/186847 | A1 | 12/2013 |
| WO | 14/018086 | A1 | 1/2014 |
| WO | 14/098077 | A1 | 6/2014 |
| WO | 15/023670 | A1 | 2/2015 |
| WO | 16/141482 | A1 | 9/2016 |
| WO | 17/027792 | A1 | 2/2017 |

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.

Hasser et al., "Preliminary Evaluation of a Shape-Memory Alloy Tactile Feedback Display," Advances in Robotics, Mechantronics, and Haptic Interfaces, ASME, DSC-Vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

Nakamura, "A Torso Haptic Display Based on Shape Memory Alloy Actuators," Massachusetts Institute of Technology, 2003, pp. 1-123.

PuntoCellulare, "LG-GD910 3G Watch Phone," YouTube (http://www.youtube.com/watch?v+HcCl87KIELM), Jan. 8, 2009, 9 pages.

Sullivan, Mark, "This Android Wear Update Turns Your Device into The Dick Tracy Watch," Fast Company (https://www.fastcompany.com/3056319/this-android-wear-update-turns-your-device-into-the-dick-tracy-watch), Feb. 4, 2016, 9 pages.

\* cited by examiner

RELUCTANCE HAPTIC ENGINE FOR AN ELECTRONIC DEVICE

CROSS-REFERENCE TO RELATED APPLICATION

This application is a nonprovisional and claims the benefit under 35 U.S.C. 119(e) of U.S. Provisional Pat. Application No. 63/246,432, filed Sep. 21, 2021, the contents of which are incorporated herein by reference as if fully disclosed herein.

FIELD

Embodiments relate generally to an electronic watch or other electronic device. More particularly, the described embodiments relate to a reluctance actuator configured to provide a haptic output for an electronic device.

BACKGROUND

Modern electronic devices commonly include a number of output devices to provide feedback or information to a user. One type of output device is a haptic actuator which is used to provide a haptic output, such as an impulse or a vibration, to a user. Haptic output may be provided in response to operations of an electronic device, such as when a user account receives an electronic message.

Traditional haptic output devices include motors and other relatively large actuation mechanisms, which occupy significant space within device enclosures. These actuation mechanisms may additionally require a relatively large amount of energy, resulting in decreased battery life.

SUMMARY

This summary is provided to introduce a selection of concepts in simplified form that are further described herein. This summary is not intended to identify key features or essential features of the claimed subject matter, nor is it intended to be used as an aid in determining the scope of the claimed subject matter.

In various embodiments of the provided disclosure, a reluctance haptic engine may be used to provide a haptic signal. The reluctance haptic engine may be configured such that a direction of a haptic force opposes a corresponding input force. In accordance with this arrangement, additive forces may be minimized or avoided. Additional features will become apparent with reference to the provided disclosure.

In some embodiments, an electronic device may be provided. The electronic device may comprise a housing defining an opening, an input structure positioned at least partially within the opening and moveable with respect to the housing, the input structure defining an input surface, and a reluctance haptic engine. The reluctance haptic engine may be positioned beneath the input structure and may comprise a core affixed to a bottom surface of the housing and comprising a conduction loop operable to receive an electrical signal, an attractor plate separated from the core by a first gap and separated from a frame coupled to the housing by a second gap, and a mechanical suspension coupling the attractor plate to the input structure and securing the attractor plate and the input structure to the housing. The electronic device may further comprise a processor configured to cause the core to generate a reluctance force by providing the electrical signal to the conduction loop, the generation of the reluctance force causing the attractor plate to move toward the core, thereby deforming the mechanical suspension, reducing the first gap between the attractor plate and the core, increasing the second gap between the attractor plate and the frame, and applying the reluctance force to the input structure.

In some implementations, the mechanical suspension may comprise a sensing element that detects an input applied to the input structure and the processor may provide the electrical signal to the conduction loop in response to the detection of the input force. An input may comprise an input force that is applied to the input structure in a first direction. A reluctance force may be applied to the input structure in a second direction and the first direction may be opposite from the second direction. In some cases, the reluctance force may extend the input structure above the housing.

According to some embodiments, an electronic device may further comprise one or more spacers coupling the mechanical suspension to the housing. The input structure may further define one or more support structures that extend through the housing and couple with the mechanical suspension. In response to an input applied to the input structure, a first gap between the attractor plate and the core may increase and the second gap between the attractor plate and the frame may decrease. In response to the reluctance force, the first gap between the attractor plate and the core may decrease and the second gap between the attractor plate and the frame may increase. An electronic device may be a laptop computer and an input structure may be a touch strip of a laptop computer.

According to some implementations, an electronic device may be provided. The electronic device may comprise a housing, a display positioned at least partially within the housing, an input structure positioned at least partially within the housing, and a reluctance haptic engine positioned below the input structure. The reluctance haptic engine may comprise an attractor plate coupled to the housing and a core comprising a conduction loop and coupled to the input structure. The core may be separated from the attractor plate by a gap and may be configured to move toward the attractor plate in response to a reluctance force produced during an actuated state, thereby raising the input structure above the housing.

An actuated state may be engaged when the conduction loop of the core receives an electrical signal. An electronic device may further comprise one or more flexible members coupling the input structure to the housing and to the core. The one or more flexible members may deform when the actuated state is engaged.

In some cases an electronic device may further comprise a frame extending beneath the reluctance haptic engine. A gap between the attractor plate and the core may be a first gap and the core may be separated from the frame by a second gap.

When an input is applied to an input structure, the first gap between the attractor plate and the core may increase and the second gap between the core and the frame may decrease. In response to the reluctance force being produced during the actuated state, the first gap between the attractor plate and the core may decrease and the second gap between the core and the frame may increase. A user input applied to the input structure may move the core in a first direction opposite from a second direction that the core may move in response to the reluctance force.

In some implementations, a method of producing a haptic output at an electronic device may be provided. The method may comprise detecting an input at an input structure, determining, in response to detecting the input, output characteristics of the haptic output to be generated by a reluctance haptic engine, generating an output signal corresponding to the determined output characteristics, and applying an electrical signal to a core of the reluctance haptic engine to generate a reluctance force, the reluctance force opposing the input.

In some cases the output characteristics may include at least one of a force value of the reluctance force, a location of the reluctance force, or a rotational speed associated with the reluctance force. Detecting the input at the input structure may comprise detecting one of a force value, an intensity, or a location of the input. The haptic output may be a local haptic output applied to the input structure.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims. Similar reference numerals have been used, where practicable, to designate similar features.

Figure 1A:
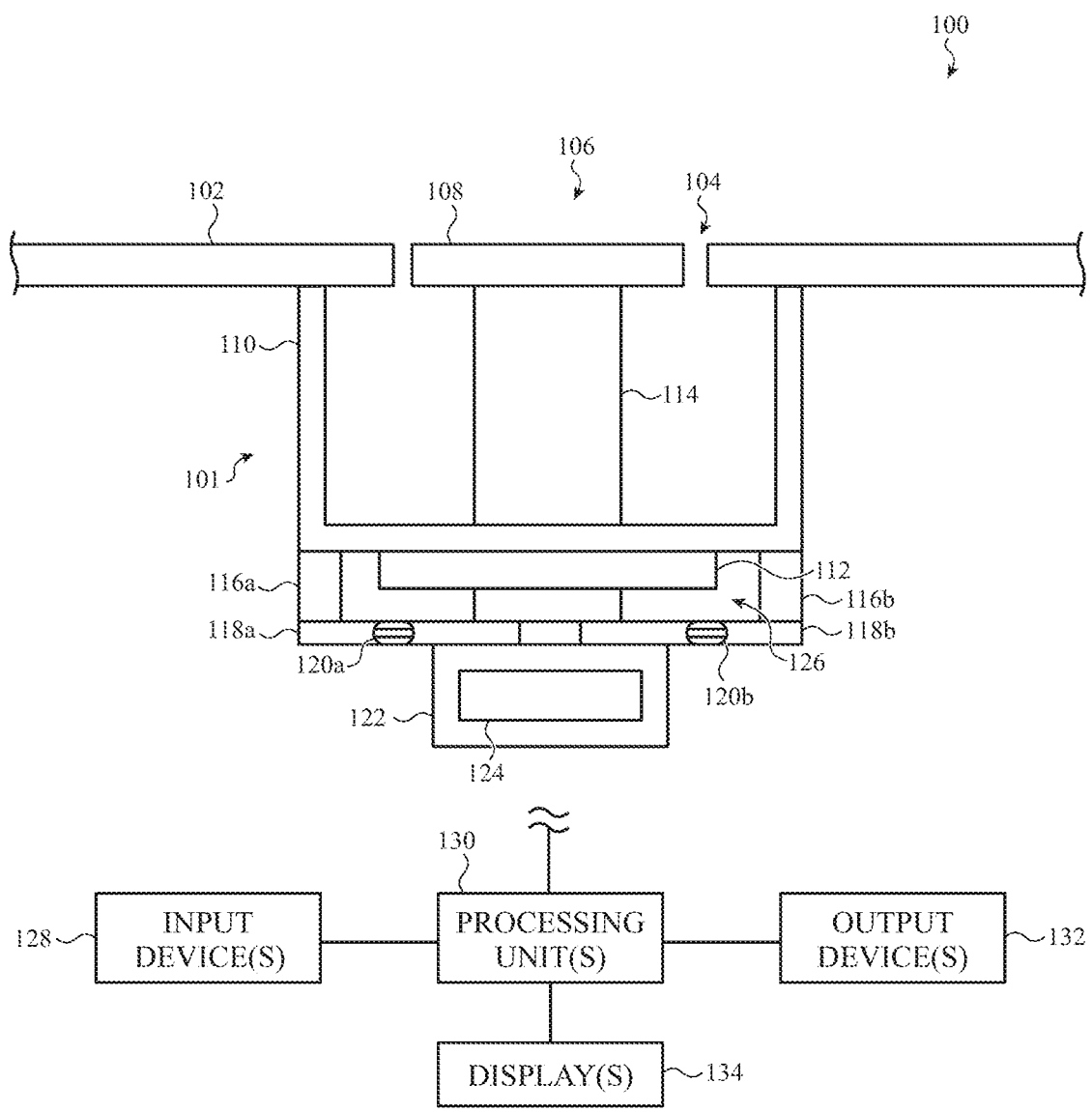
FIGS. 1A-1B depict functional block diagrams of an example electronic device that incorporates a reluctance haptic engine with flexible support members, as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The embodiments described herein are directed to an electronic device having a reluctance haptic engine configured to provide haptic output to a user of the electronic device. In various embodiments, the reluctance haptic engine includes a core and an attractor plate. The core and/or the attractor plate may be coupled to an input structure, such as a button cap, trackpad cover, touchscreen cover, and so on. In an unactuated configuration, flexible support members maintain a gap between the core and the attractor plate. An electrical current may be applied to one or more conduction loops of the core to actuate the reluctance haptic engine and provide a haptic output by moving the input structure. The electrical current may cause a magnetic flux resulting in a reluctance force that pulls the attractor and the core together and causes the input structure to move (e.g., translate, rotate, oscillate, vibrate, or deform) to produce a haptic output. In an actuated configuration, a biasing force applied by the flexible support members to maintain the gap may be overcome by the reluctance force, and the gap between the core and the attractor plate is reduced or closed.

Some of the embodiments herein are directed to a reluctance haptic engine that provides a force (e.g., an engine force) that opposes a user input force. For example, a user may impart an input force to an input device such as a button. The input force may cause the button to depress, or otherwise move, with respect to an associated housing. The reluctance haptic engine may, in response to detecting the input force, impart an engine force in a direction opposite from the user input force. As will become apparent throughout the disclosure, the engine force may at least partially offset the user input force.

The movement of the attractor plate and/or the core may result in deflection and/or deformation of one or more of the flexible support members. For example, the flexible support members may transition from a non-deformed state to a deformed state or from a deformed state to a further-deformed state under the applied reluctance force, resulting in and/or allowing the movement of the attractor plate toward the core and/or allowing the movement of the core toward the attractor plate. When the electrical currents applied to the one or more conduction loops are reduced or ceased, the biasing force of the flexible support members may overcome the reluctance force and cause the biasing members to transition from a deformed state to the non-deformed state (or from a deformed state to a less-deformed state), thereby separating the actuator plate and the core (e.g., moving the actuator away from the core) and/or reestablishing the gap.

As used herein, the terms "deform" or "deformation" may be used to refer to any change in shape or form of a component, including as a result of bending, torsion, tensile forces shear forces, compressive forces, or the like. As used herein, the terms "deflect" or "deflection" may refer to displacement of a component or a portion thereof from one position to another.

In some cases, the reluctance haptic engine may be used to detect inputs to the electronic device. The flexible support members may deflect or deform in response to a force applied to the input structure, for example by a user input. The flexible support members may include one or more sensing elements that may be used to sense inputs based on measuring deflection and/or deformation of the flexible support members. For example, the sensing elements may include one or more strain sensors positioned along the flexible support members and configured to output a signal that varies based on the deflection and/or deformation of the flexible support members.

In some cases, the signals provided by the sensing elements may be used to determine spatial parameters of the attractor plate, the core, and/or the input structure. The spatial parameters may include, but are not limited to, a position, displacement, velocity, and acceleration. The spatial parameters determined from the signals provided by the sensing elements may be used to determine a location and/or magnitude (e.g., force measurement) of an input to the input member. For example, a location and/or magnitude of an input may be determined by determining a difference between output signals of two or more sensing elements. The magnitude of one or more output signals may be used to estimate a magnitude of force applied to the input member.

A first flexible support member may be coupled to a first side of the core, and a second flexible support member may be coupled to a second side of the core that is opposite the first side. Positioning the flexible support members on opposite sides of the core may provide enhanced stability for the attractor plate and/or the core and may allow the sensing elements positioned along the flexible support members to more effectively be used to detect the locations and/or magnitudes of inputs and/or feedback related to haptic outputs.

As used herein, the terms "haptic output" and "tactile output" may refer to outputs produced by the electronic device that may be perceived through user touch. Examples of haptic outputs include vibrations, deflections, and other movements of a device enclosure, a device cover, or input device, or another device component that forms an input surface of the electronic device. In some cases, a reluctance haptic engine may vibrate, displace, and/or deflect a device component (e.g., an enclosure, a cover, or an input device) to produce a haptic output at an external surface of the device defined by the device component. In some cases, haptic outputs may be produced by relative movement of one or more device components with respect to one or more additional device components. As one example, a reluctance haptic engine may cause a first device component (for example, a cover) to vibrate, oscillate, rotate and/or translate relative to another device component (for example, an enclosure) to produce a haptic output that may be perceived by a user.

In various embodiments, an input to a reluctance haptic engine (e.g., an input to an input device as discussed herein) may be detected by the reluctance haptic engine through self-inductance properties of electrically conductive coils of a core of the reluctance haptic engine. As depicted throughout, a gap between a core and an attractor plate may increase in response to a user input (e.g., to the input device). As a result of the increase in the gap, a magnetic flux stimulated by a current associated with the electrically conductive coils may decrease. An inductance associated with the electrically conductive coils may similarly decrease in response to an increasing gap between the core and the attractor plate. By detecting these properties, an input may be detected.

In some cases, the reluctance haptic engine is coupled to an enclosure of the electronic device and provides haptic outputs that may be tactilely perceived by the user along one or more portions of an external surface (such as an input or output surface) of the electronic device. In some cases, the reluctance haptic engine is coupled to a contact member that moves (e.g., oscillates, vibrates, translates or rotates) with respect to other components of the electronic device, such as a housing member, to provide haptic outputs. Translation may include inward and outward translation, lateral translation, and other movement of the contact member. In some cases, the reluctance haptic engine provides haptic outputs by deflecting a portion of an enclosure of the electronic device. Different types of movement may be used to provide different haptic outputs.

In some cases, the haptic outputs described herein are localized haptic outputs. As used herein, the term "localized haptic output" may be used to refer to a haptic output that is outputted through or at a particular location or region along a particular external surface of the electronic device, such as at an input surface or a portion thereof, while being imperceptible or absent from other external surfaces (or another portion of the particular external surface). The reluctance haptic engines described herein may produce localized haptic outputs causing vibration, deflection, or movement at particular locations or regions of the external surfaces of the electronic device. In some cases, a localized haptic output may be felt strongly at one or more locations or regions of the external surfaces and may be imperceptible or less perceptible at one or more other locations or regions of the external surfaces of the electronic device.

In some cases, localized haptic outputs may provide feedback regarding inputs received at particular locations of the electronic device. For example, localized haptic outputs may be provided at and/or near an input device (e.g., a button, a key, a crown, a trackpad, or a touchscreen) to provide feedback related to an input provided at the input device. In other cases, localized haptic outputs may provide other types of feedback or information to users.

In some cases, the haptic outputs described herein are global haptic outputs. As used herein, the term "global haptic output" may refer to a haptic output that is produced in a large area and, in some cases, across or through substantially all of the electronic device. As described herein, a reluctance haptic engine may cause a mass or weighted member to move and, in some cases, oscillate, to produce a perceptible vibration or tactile effect along the external surfaces of the electronic device. In general, global haptic outputs are not localized to any particular location or region of the external surfaces of the electronic device. In some cases, global haptic outputs may provide feedback that is not related to a specific location on the electronic device. For example, global haptic outputs may be provided for alerts received at the electronic device. In other cases, global haptic outputs may provide other types of feedback or information to users.

The term "attached," as used herein, may be used to refer to two or more elements, structures, objects, components, parts, or the like that are physically affixed, fastened, and/or retained to one another. The term "coupled," as used herein, may be used to refer to two or more elements, structures, objects, components, parts, or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" or "electrically coupled"

may be used to refer to two or more devices that are coupled in any suitable manner for operation and/or communication, including wired, wirelessly, or some combination thereof.

These and other embodiments are discussed with reference to FIGS. 1A-7. However, those skilled in the art will readily appreciate that the detailed description given herein with respect to these figures is for explanatory purposes only and should not be construed as limiting.

Figure 1B:
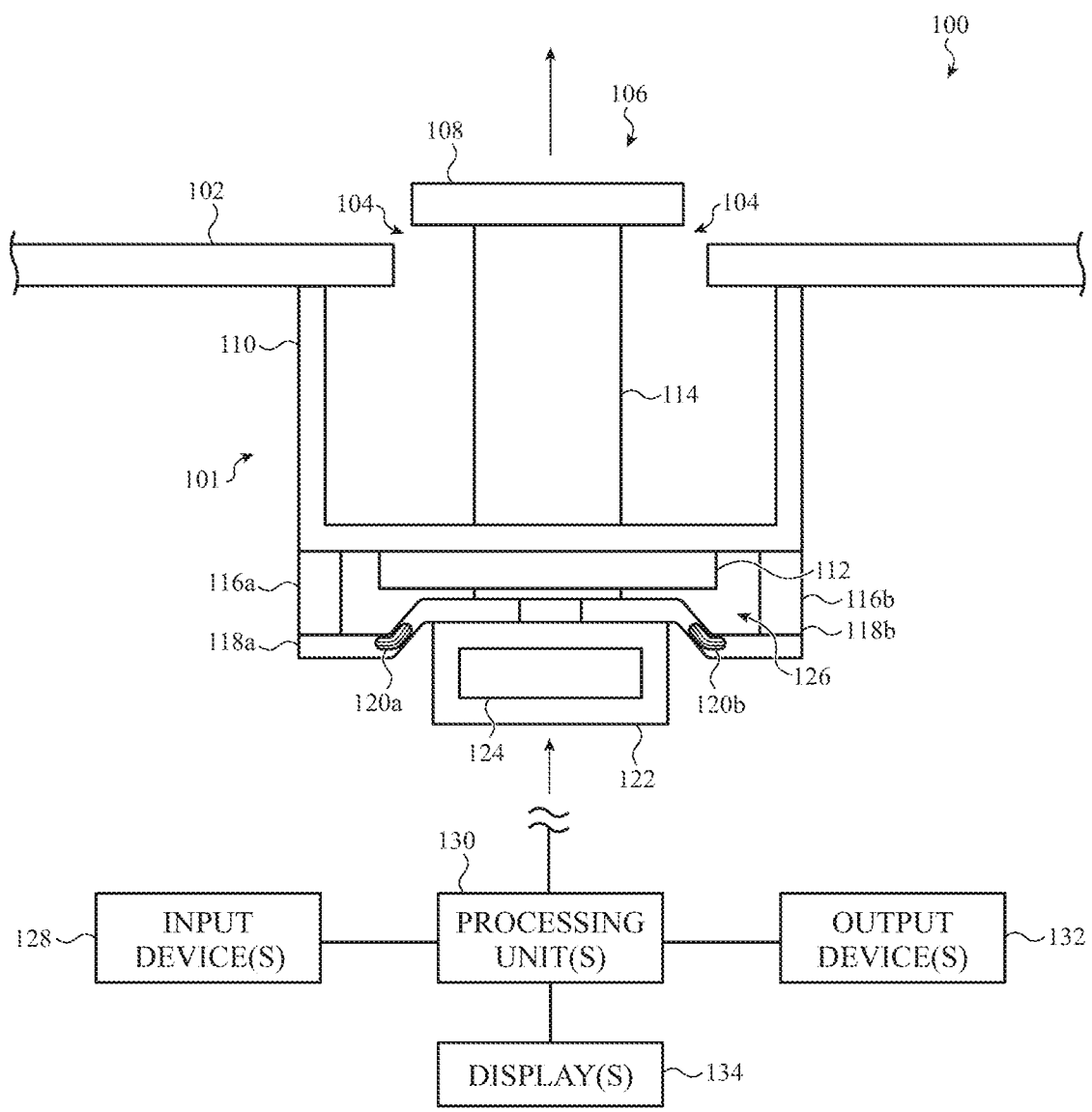

FIGS. 1A-1B depict functional block diagrams of an example electronic device 100 that incorporates a reluctance haptic engine 101. The electronic device 100 may include a housing 102, otherwise referenced as a device enclosure or simply "enclosure," a reluctance haptic engine 101, one or more input devices 128, one or more output devices 132, a display 134, and a processing unit 130 positioned at least partially within the housing 102.

The reluctance haptic engine 101 may be positioned at least partially within the housing 102 of the electronic device 100 and may be configured to provide haptic outputs along an external surface (e.g., an input surface 108) of the electronic device 100. In various embodiments, the reluctance haptic engine 101 may provide localized haptic outputs at particular locations or regions of the external surfaces of the electronic device 100. In some cases, the reluctance haptic engine 101 may provide global haptic outputs along the external surfaces of the electronic device.

In some cases, as shown in FIGS. 1A-1B, the reluctance haptic engine 101 may be positioned beneath and/or coupled to an input structure 106 that defines an input surface 108 of the electronic device 100. The input structure 106 may be a portion of a device housing or cover, such as a top case of a laptop computer. In some cases, the input structure 106 is at least a portion of an input device 128, such as a button, crown, trackpad, key, or the like. For example, the input structure 106 may be a button cap, a keycap, a trackpad cover, a crown body, and so on. In some cases, the input structure 106 is a cover positioned over a display 134, such as a touchscreen display. In some cases, the input structure 106 is a portion of the housing 102 of the electronic device 100 and is continuous with one or more additional portions of the housing 102. Inputs received at the input surface 108 and/or haptic outputs provided at the input surface 108 by the reluctance haptic engine 101 may cause the input structure 106 or portions thereof to deform or deflect with respect to other portions of the input structure 106 and/or other portions of the components defining the external surfaces of the electronic device 100.

In some cases, the input structure 106 may be a separate component from one or more portions of the housing 102. In some cases, the housing 102 and the input structure 106 cooperate to define at least part of the external surfaces of the electronic device 100. In some cases, the input structure 106 is positioned in an opening 104 defined by the housing 102. The input structure 106 may be configured to move (e.g., rotate, translate, or the like) relative to one or more additional components of the electronic device 100, such as the housing 102. For example, the input structure 106 may be configured to translate inward and outward (e.g., up and down with respect to FIGS. 1A-1B) with respect to the housing 102. Inputs received at the input surface 108 and/or haptic outputs provided at the input surface 108 by the reluctance haptic engine 101 may cause the input structure 106 or portions thereof to move (e.g., translate, rotate, or the like), deform, or deflect with respect to other portions of the input structure and/or other portions of the components defining the external surfaces of the electronic device.

In some cases, the reluctance haptic engine 101 is positioned beneath a structure that is not a portion of an input device (e.g., a portion of the housing 102) and/or the reluctance haptic engine 101 provides haptic outputs at one or more surfaces that are not input surfaces.

The reluctance haptic engine 101 may include an attractor plate 112 and a core 122. The attractor plate 112 may be coupled to the core 122 by one or more flexible support members 118a/118b. The one or more flexible support members 118a/118b may include any mechanical suspension structure, such as a metallic flexure, an elastic gel structure, a wire mesh, any combination thereof, and so on. The flexible support members 118a/118b may be formed of a compliant or bendable material that allows the relative movement between the attractor plate 112 and the core 122. FIG. 1A depicts the reluctance haptic engine 101 in an unactuated configuration in which the attractor plate 112 and the core 122 are spaced apart by a gap 126. In some cases, the flexible support members 118a/118b may provide a biasing force to maintain the gap 126 between the attractor plate 112 and the core 122 (e.g., in the absence of an electrical current in the conduction loops 124).

The reluctance haptic engine 101 may include one or more spacers (e.g., spacers 116a/116b) between the flexible support members 118a/118b and the attractor plate 112 and/or the core 122 that help to define the gap 126. FIG. 1B depicts the reluctance haptic engine 101 in an actuated configuration in which the gap 126 between the attractor plate 112 and the core 122 is reduced or eliminated. The reluctance haptic engine 101 may actuate (e.g., transition from an unactuated configuration to an actuated configuration) in response to a reluctance force generated within the reluctance haptic engine. This reluctance force may be generated in response to a force applied to the reluctance haptic engine 101 and/or the input structure 106, such as by a user input on the input surface 108 of the input structure 106.

The core 122 may include one or more conduction loops 124 (e.g., electromagnetic coils, electrically conductive coils, wire loops, or other electrically conductive materials). Electrical currents (e.g., alternating current, electromagnetic signals, or drive signals) induced in the conduction loops 124 may generate magnetic flux. The magnetic flux passing through the attractor plate 112 and/or the core 122 causes a reluctance force that results in attraction between the attractor plate 112 and the core 122. As depicted in FIG. 1B, the attraction may result in displacement of the attractor plate 112 toward the core 122, reducing or closing the gap 126 and thereby displacing at least a portion of the input surface 108 away from the attractor plate 112 (e.g., above a surface of the housing 102) to produce the haptic output. Actuation of the reluctance haptic engine 101 may produce a haptic output or a portion thereof. The haptic output may be localized along at least a portion of the input structure 106 and/or a global haptic output along a larger portion or a substantial entirety of the housing 102.

As depicted in FIG. 1B, actuation of the reluctance haptic engine 101 may be accompanied by deformation of one or more of the flexible support members 118a/118b. During the transition from the unactuated configuration to the actuated configuration of the reluctance haptic engine 101, the flexible support members 118a/118b may deform as the gap 126 between the attractor plate 112 and the core 122 is reduced. That is, the flexible support members 118a/118b may transition from a non-deformed state (e.g., as depicted in FIG. 1A) to a deformed state (e.g., as depicted in FIG. 1B), or from a deformed state to a further-deformed state, as a result of the applied reluctance force, in accordance with the displacement of the core 122 toward the attractor plate 112.

When the reluctance force is reduced or ceased (e.g., when the electrical currents applied to the conduction loops 124 are reduced or ceased) or when the input force is reduced or ceased, the biasing force of the flexible support members 118a/118b may overcome the reluctance force and/or the input force and cause the biasing members to transition from a deformed state to the non-deformed state (or from a deformed state to a less-deformed state), thereby displacing the core 122 away from the attractor plate 112 and/or reestablishing the gap 126. Displacing the core 122 away from the attractor plate 112 may produce a haptic output or a portion thereof.

The attractor plate 112 may be attached or otherwise coupled to a frame 110 extending from the housing 102. The frame 110 may be affixed, or otherwise coupled, to the housing 102 and may be immobile with respect to the housing 102. The core 122 may be moveable with respect to the housing 102 such that the core 122 moves in accordance with an attraction force between the attractor plate 112 and the core 122. The core 122 may move relative to the attractor plate 112, the frame 110, and/or the housing 102. The displacement of the core 122 may cause a corresponding movement and/or deformation of the portion of the input surface 108 defined by the input structure 106. For example, as shown in FIG. 1B, the input surface 108 may be displaced upward, or away from the attractor plate 112, as the core 122 moves toward the attractor plate 112. In some cases, the reluctance haptic engine 101 is coupled to the input structure 106 by one or more connection elements 114. The connection elements 114 may transfer motion from the reluctance haptic engine 101 to the input structure 106, thereby producing a haptic output along or through the input surface 108. The connection elements 114 may extend through the frame 110 and/or the attractor plate 112 and may couple the input structure 106 with the flexible support members 118a/118b, as depicted in FIGS. 1A-1B.

In various embodiments, the positions of the attractor plate 112 and the core 122 may be reversed from what is shown in FIGS. 1A-1B. For example, the core 122 may be attached or otherwise coupled to the frame 110, and the attractor plate 112 may be attached or otherwise coupled to the connection elements 114, such that movement of the attractor plate 112 relative to the core 122, the frame 110, and/or the housing 102 causes a corresponding displacement and/or deformation of the portion of the input surface 108 defined by the input structure 106. As such, while the examples described herein describe displacement of the core 122, they are additionally meant to encompass examples in which the attractor plate 112 is displaced.

The reluctance haptic engine 101 may provide a haptic output by deflecting or deforming a portion of the housing 102. For example, the reluctance haptic engine 101 may deflect or displace a portion of the housing 102 inward and/or outward to provide a haptic output at the input surface 108. Deflection or other movement of the housing 102 against a user's skin, or other object, may produce a haptic output that can be perceived by the user.

The reluctance haptic engine 101 may provide a haptic output by oscillating, vibrating, translating, and/or rotating a component of the electronic device 100 relative to other components of the electronic device 100. For example, the reluctance haptic engine 101 may cause the input structure 106 to move relative to one or more other portions of the housing 102 of the electronic device 100. The movement of the input structure 106 may be inward (e.g., downward with respect to FIGS. 1A-1B), outward (e.g., upward with respect to FIGS. 1A-1B), lateral (e.g., left-to-right and/or right-to-left with respect to FIGS. 1A-1B), vibratory, oscillating, or some combination thereof. In some cases, the haptic output provided by the reluctance haptic engine 101 offsets an input received at the input structure 106. For example, in response to an inward force applied to the input structure 106 (e.g., downward with respect to FIG. 1B), the reluctance haptic engine 101 may produce a haptic output that moves the input structure 106 upward to provide an opposing force, thereby offsetting the inward force applied to the input structure 106.

In some cases, the reluctance haptic engine 101 may provide a global haptic output by moving a mass or weighted member within the housing 102. The reluctance haptic engine 101 may cause the mass or weighted member to move and, in some cases, oscillate, to produce a perceptible vibration or tactile effect along an external surface of the electronic device 100.

The attractor plate 112 may be or include a permanent magnet (e.g., formed of or including a magnetic material), an electromagnet, or may be or include a ferromagnetic element (e.g., formed of or including ferromagnetic material) that does not produce a magnetic field absent the influence of another magnetic field. Example magnetic materials include, but are not limited to, magnetized iron, nickel, and/or cobalt alloys (e.g., steel), ferrite, or other suitable materials. Example ferromagnetic materials include, but are not limited to, unmagnetized iron, nickel, and/or cobalt alloys (e.g., steel), ferrite, or other suitable materials. In some cases, the attractor plate 112 is formed of or includes an iron-cobalt alloy with equal parts iron and cobalt (e.g., FeCo50). The type of material used for the attractor plate 112 may depend on various factors, such as the particular electromagnetic interaction that the haptic output system uses to produce the haptic output.

The core 122 may be or include any suitable material or combination of materials, including metal, plastic, composites, ceramics, and so on. The core 122 may be or include a permanent magnet, or it may be or include a ferromagnetic element that does not produce a magnetic field absent the influence of another magnetic field. In some cases, the core 122 is formed of or includes an iron-cobalt alloy with equal parts iron and cobalt (e.g., FeCo50). In some cases, the core 122 is formed of or includes stainless steel, such as grade 430 stainless steel. The type of material used for the core 122 may depend on various factors, such as the particular electromagnetic interaction that the haptic output system uses to produce the haptic output.

The reluctance haptic engine 101 may produce haptic outputs in response to receiving one or more signals from the processing unit 130. In some cases, the haptic outputs may correspond to inputs received by the electronic device 100 and/or outputs provided by the electronic device 100. The haptic outputs may correspond to operational states, events, or other conditions at the electronic device 100, including inputs received at the electronic device 100 (e.g., touch inputs, rotational inputs, translational inputs), outputs of the electronic device 100 (e.g., graphical outputs, audio outputs, haptic outputs), applications and processes executing on the electronic device, predetermined sequences, user interface commands (e.g., volume, zoom, or brightness controls, audio or video controls, scrolling on a list or page, and the like), and so on.

The reluctance haptic engine 101 may be operably coupled to the processing unit 130 via a connector and/or via one or more additional components of the electronic device 100. In some cases, the reluctance haptic engine 101 may produce audio outputs in addition to or as an alternative to producing haptic outputs. For example, actuation of the reluctance haptic engine 101 may produce a sound. Audio outputs may be produced in response to any of the conditions, inputs, or the like discussed above with respect to haptic outputs. In some cases, audio outputs and haptic outputs are produced by the same actuation or actuations of the reluctance haptic engine 101.

As noted above, the reluctance haptic engine 101 may actuate (e.g., transition from an unactuated configuration to an actuated configuration) in response to a reluctance force generated within the reluctance haptic engine 101 and/or in response to a force applied to the reluctance haptic engine 101, such as by a user input on the input structure 106. In some cases, the reluctance haptic engine 101 may include sensing elements that may be used to determine whether and to what degree the haptic device has been actuated, either by an input or a reluctance force.

Still with respect to FIG. 1B, the flexible support members 118a/118b may include one or more sensing elements 120a/120b that may be used to sense actuation based on measuring deflection and/or deformation of the flexible support members 118a/118b. As noted above, the flexible support members 118a/118b may deflect or deform in response to actuation of the reluctance haptic engine 101, for example by a user input and/or a reluctance force. The sensing elements 120a/120b may include one or more sensors (e.g., strain sensors) positioned along the flexible support members 118a/118b and configured to output a signal that varies based on the deflection and/or deformation of the flexible support members. Additionally or alternatively, other types of sensing elements may be used for sensing actuation. As one example, the reluctance haptic engine 101 may include one or more capacitive sensors. A first capacitive electrode may be positioned on the attractor plate 112 and a second capacitive electrode may be positioned on the core 122, and a change in a capacitance between the two electrodes may be used to determine the relative position of the core 122 and the attractor plate 112. Similarly, a first capacitive electrode may be positioned on a flexible support member 118a/118b and a second capacitive electrode may be positioned on the frame 110.

In some cases, the signals provided by the sensing elements 120a/120b may be used to determine spatial parameters of the attractor plate 112, the core 122, the flexible support members 118a/118b, and/or the input structure 106. The spatial parameters may include, but are not limited to, a position, displacement, velocity, and acceleration. The spatial parameters determined from the signals provided by the sensing elements 120a/120b may be used to determine a location and/or magnitude (e.g., force measurement) of an input to the input structure 106. For example, a location of an input may be determined by determining a difference between output signals of two or more sensing elements 120a/120b. The magnitude of one or more output signals may be used to estimate a magnitude of force applied to the input structure 106.

In some cases, the processing unit 130 may analyze detected changes in inductance between the attractor plate 112 and the core 122 to detect inputs. In some embodiments an isolated inductive sensing coil may be positioned on the frame 110 and may be used to detect inputs by detecting a change in an air gap between the frame 110 and the flexible support members 118a/118b. Additionally or alternatively, an isolated inductive sensing coil may be positioned on or otherwise coupled to a flexible support member 118a/118b, and may be used to detect inputs by detecting a change in an air gap between the flexible support member 118a/118b and the frame 110.

In some cases, in response to detecting an input to the input structure 106, the processing unit 130 causes the reluctance haptic engine 101 to produce a haptic output. For example, in response to receiving an inward (e.g., downward with respect to FIGS. 1A-1B) press on the input structure 106, the reluctance haptic engine 101 may produce a haptic output by generating a reluctance force that applies an opposing force (e.g., an outward force) on the input structure 106 to offset the user input.

In some cases, the signals provided by the sensing elements 120a/120b may be used to determine characteristics of haptic outputs provided by the reluctance haptic engine 101. Characteristics of the haptic outputs may include a strength of the haptic output, a frequency of movement associated with the haptic output, and so on. The processing unit 130 may determine the haptic output characteristics by using the signals provided by the sensing elements 120a/120b to determine spatial parameters of the attractor plate 112, the core 122, the flexible support members 118a/118b, and/or the input structure 106 caused by a reluctance force. The processing unit 130 may use the determined spatial parameters and/or haptic output characteristics to adjust the haptic outputs by changing signal characteristics (e.g., frequency, amplitude, or waveform) of the electrical current provided to the conduction loops 124.

A first flexible support member 118a may be coupled to a first side of the core 122, and a second flexible support member 118b may be coupled to a second side of the core 122 that is opposite the first side, as depicted in FIG. 1A. Positioning the flexible support members 118a/118b on opposite sides of the core 122 may provide enhanced stability for the core 122 and may allow the sensing elements 120a/120b positioned along the flexible support members 118a/118b to more effectively be used to detect the locations and/or magnitudes of inputs and/or feedback related to haptic outputs.

The flexible support members 118a/118b may be formed of any suitable material or combination of materials, including metal, plastic, composites, or ceramics. The flexible support members 118a/118b may be formed of a compliant or bendable material that allows the relative movement between the attractor plate 112 and the core 122. In some cases, the flexible support members 118a/118b are formed of stainless steel, such as grade 301 stainless steel. The spacers 116a/116b may be formed of any suitable material or combination of materials, including metal, plastic, composites, or ceramics. In some cases, the spacers 116a/116b are formed of stainless steel, such as grade 301 stainless steel. The frame 110 may be formed of any suitable material or combination of materials, including metal, plastic, composites, or ceramics. In some cases, the frame 110 is formed of stainless steel, such as grade 316 stainless steel.

In various embodiments, the display 134 may be positioned at least partially within the housing 102. The display 134 provides a graphical output, for example associated with an operating system, user interface, and/or applications of the electronic device 100. In one embodiment, the display 134 includes one or more sensors and is configured as a touch-sensitive (e.g., single-touch, multi-touch) and/or force-sensitive display to receive inputs from a user. The display 134 is operably coupled to the processing unit 130 of the electronic device 100, for example by a connector. In some cases, the graphical output of the display 134 is visible along at least a portion of an external surface of the electronic device 100.

In various embodiments, a graphical output of the display 134 is responsive to inputs provided at the display and one or more additional input devices 128. For example, the processing unit 130 may be configured to modify the graphical output of the display 134 in response to determining an electrocardiogram, receiving rotational inputs, receiving translational inputs, or receiving touch inputs. In some cases, a haptic output provided by the reluctance haptic engine 101 corresponds to the graphical output of the display 134. In some cases, the reluctance haptic engine 101 may produce a haptic output that is coordinated with a change in the graphical output of the display 134. For example, the haptic output may be produced at or near the same time as the change in the graphical output of the display 134. In some cases, a time that the haptic output is produced overlaps a time that the graphical output of the display 134 changes.

The display 134 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 134 is positioned beneath and viewable through a transparent cover.

Broadly, the input devices 128 may detect various types of input, and the output devices 132 may provide various types of output. The input structure 106, either alone or in combination with the reluctance haptic engine 101, may be an example of an input device 128. Similarly, the input structure 106, either alone or in combination with the reluctance haptic engine 101, may be an example of an output device 132. The processing unit 130 may be operably coupled to the input devices 128 and the output devices 132, for example by connectors. The processing unit 130 may receive input signals from the input devices 128, in response to inputs detected by the input devices 128. The processing unit 130 may interpret input signals received from one or more of the input devices 128 and transmit output signals to one or more of the output devices 132. The output signals may cause the output devices 132 to provide one or more outputs. Detected input at one or more of the input devices 128 may be used to control one or more functions of the electronic device 100. In some cases, one or more of the output devices 132 may be configured to provide outputs that are dependent on, or manipulated in response to, the input detected by one or more of the input devices 128. The outputs provided by one or more of the output devices 132 may also be responsive to, or initiated by, a program or application executed by the processing unit 130 and/or an associated companion device. In some cases, the output devices 132 may include a speaker, and the processing unit 130 may cause the speaker to produce an audio output in conjunction with a haptic output provided using the reluctance haptic engine 101. Examples of suitable processing units, input devices, output devices, and displays are discussed in more detail below with respect to FIG. 7.

In some implementations, the haptic engine 101 may act as a speaker for generating audio. A frequency of the core's 122 position relative to the attractor plate 112 may be set to a relatively high frequency (e.g., above 500 Hz) or to any frequency suitable to produce audible sound. In some cases, a haptic output signal generated by the haptic engine 101 and an audio signal generated by the haptic engine 101 may be played simultaneously and/or at different frequencies. The frequencies may be multiplexed in the frequency domain and/or the time domain.

Figure 2A:
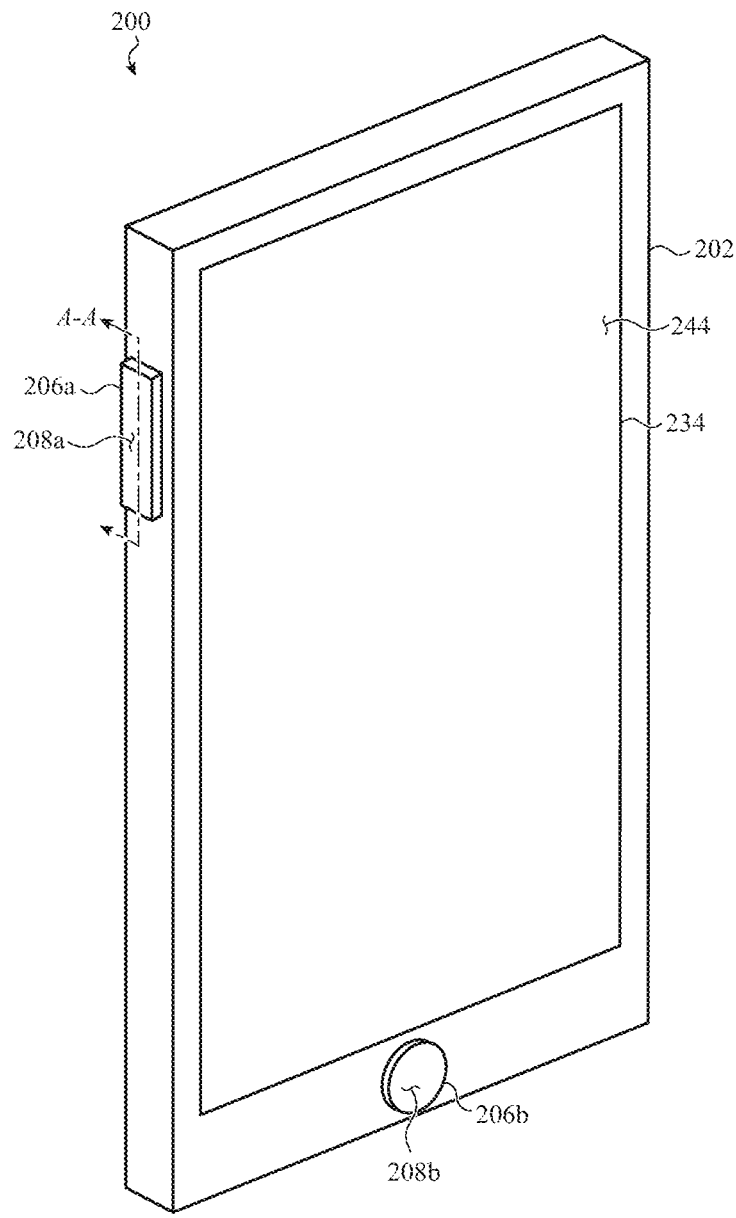
FIGS. 2A-2C illustrate an example electronic device that may incorporate a reluctance haptic engine with flexible support members and having a stationary core comprising one or more conduction loops, as described herein.
Figure 2B:
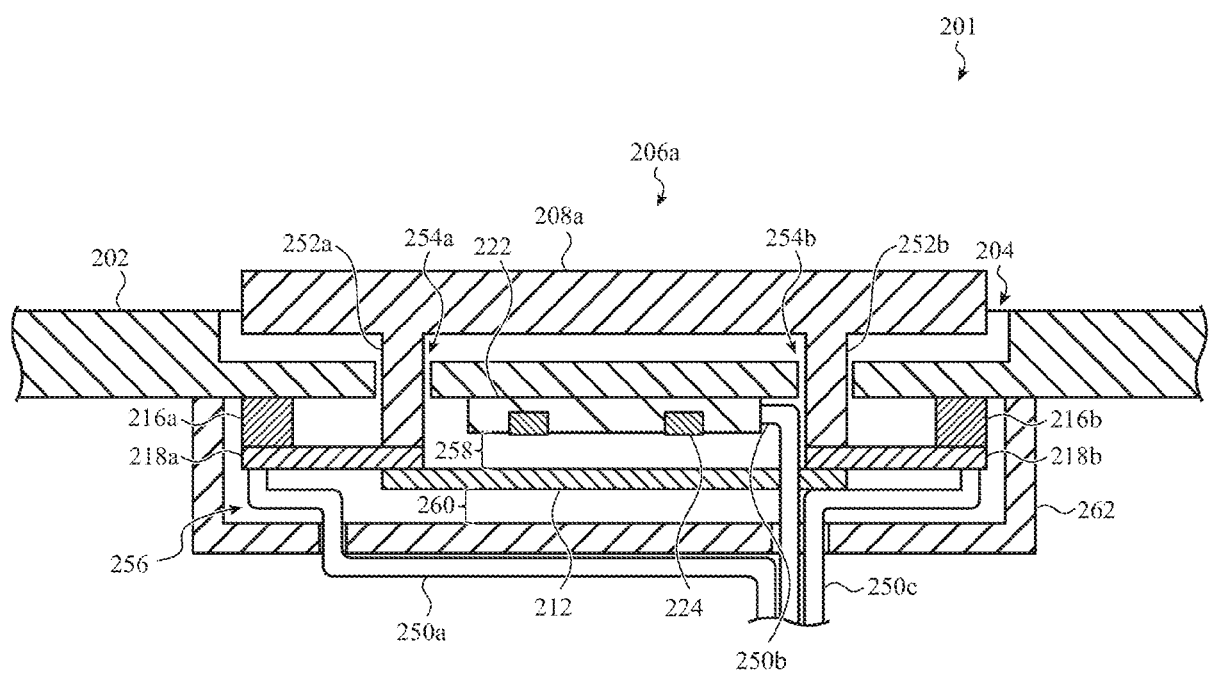
Figure 2C:
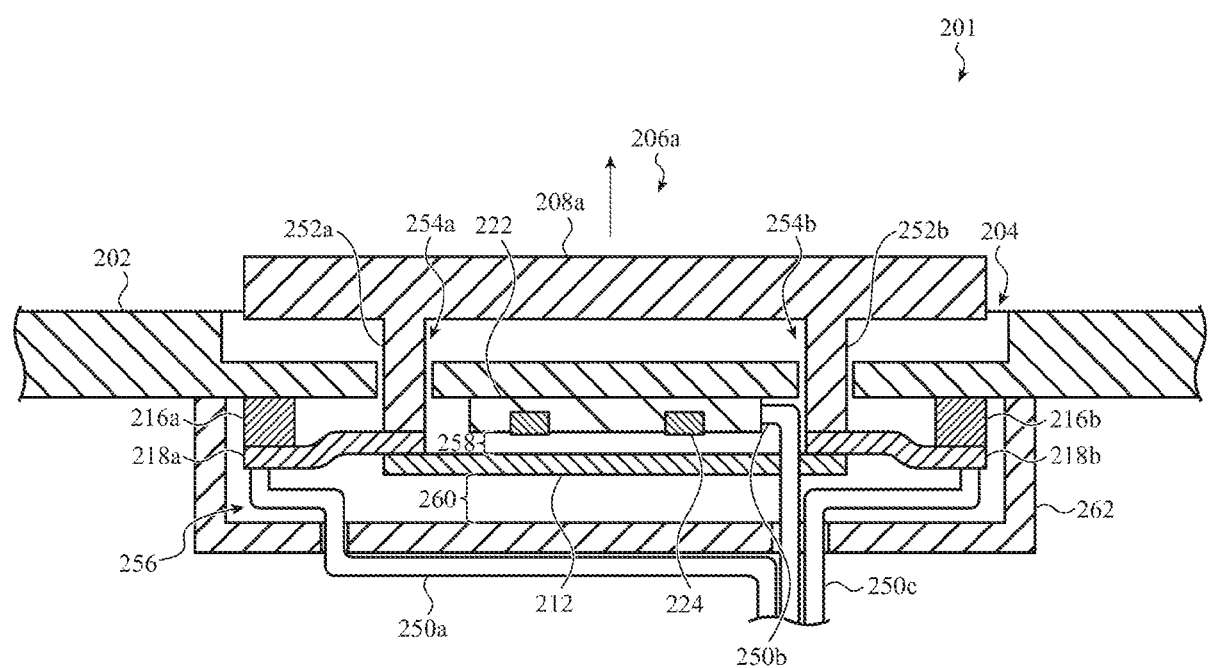

FIGS. 2A-2C illustrate an example electronic device 200 and an associated reluctance haptic engine 201. The electronic device 200 illustrated in FIG. 2A is a portable electronic device such as a smartphone, tablet, portable media player, or other mobile device. The electronic device 200 includes a housing 202 at least partially surrounding a display 234, and one or more input structures 206a and 206b defining input surfaces 208a and 208b, respectively. The input structures 206a and 206b of the electronic device 200 may be similar to the input structures discussed herein and may include similar structure and/or functionality. The electronic device 200 can also include one or more internal components typical of a computing or electronic device, such as, for example, one or more processing units, memory components, or network interfaces. A transparent cover 244 may be positioned over the display 234. The transparent cover 244 may be formed from any transparent material and may be, for example, a glass, sapphire, or plastic.

The input structures 206a and 206b may be configured to control various functions and components of the electronic device 200, such as a graphical output of the display 234, an audio output, or powering the electronic device on and off. An input structure 206a/206b may be configured, for example, as a power button, a control button (e.g., volume control), or a home button. In some implementations, the input structure 206a/206b may be a portion of the display 234.

The housing 202 provides a device structure, defines an internal volume of the electronic device 200, and houses device components. In various embodiments, the housing 202 may be constructed from any suitable material, including metals (e.g., aluminum, titanium, and the like), polymers, or ceramics (e.g., glass, sapphire). In one embodiment, the housing 202 is constructed from multiple materials. The housing 202 can form an external surface or partial external surface and protective case for the internal components of the electronic device 200, and may at least partially surround the display 234. The housing 202 can be formed of one or more components operably connected together, such as a front piece and a back piece. Alternatively, the housing 202 can be formed of a single piece operably connected to the display 234.

The display 234 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. The display 234 provides a graphical output, for example associated with an operating system, user interface, and/or applications of the electronic device 200. In one embodiment, the display 234 includes one or more sensors and is configured as a touch-sensitive (e.g., single-touch, multi-touch) and/or force-sensitive display to receive inputs from a user. In various embodiments, a graphical output of the display 234 is responsive to inputs provided to the input structures 206a and 206b.

FIGS. 2B and 2C illustrate partial cross-section views of the electronic device 200 showing the input structure 206a and a reluctance haptic engine 201 positioned beneath the input structure, taken through section line A-A of FIG. 2A. The input structure 206a may be positioned in a recess 204 in the housing 202. The input structure 206a may include or be coupled to one or more support structures 252a/252b extending through openings 254a/254b into an interior volume 256 of the electronic device 200. The input structure 206a may be attached or otherwise coupled to a reluctance haptic engine 201 configured to provide haptic outputs and/or detect inputs at the input surface 208a of the input structure 206a. As shown in FIG. 2B, each of the support structures 252a/252b may be attached or otherwise coupled to a flexible support member 218a/218b. The reluctance haptic engine 201 may include an attractor plate 212, a core 222, conduction loops 224, and the flexible support members 218a/218b.

A first end of each flexible support member 218a/218b may be attached or otherwise coupled to the housing 202 (e.g., by a respective spacer 216a/216b), a frame 262, or another component of the electronic device 200. A second end of each flexible support member 218a/218b may be attached or otherwise coupled to an attractor plate 212 such that the attractor plate 212 is able to move relative to the housing 202, the frame 262, and/or the core 222. A first end portion of a first flexible support member 218a may be fixed with respect to (e.g., coupled or attached to) a first side of the attractor plate 212, and a first end portion of a second flexible support member 218b may be fixed with respect to (e.g., coupled or attached to) a second side of the attractor plate 212 that is opposite the first side, as shown in FIG. 2B. Second end portions of the first and second flexible support members 218a/218b may be fixed with respect to (e.g., coupled or attached to) the housing 202. The input structure 206a may be coupled or attached to an end portion of each flexible support member 218a/218b for example by the support structures 252a/252b, though the input structure 206a may be coupled or attached to any portion of each flexible support member 218a/218b.

Positioning the flexible support members 218a/218b on opposite sides of the attractor plate 212 may provide enhanced stability for the attractor plate 212 and/or the input structure 206a, and may allow sensing elements positioned along the flexible support members to more effectively be used to detect the locations and/or magnitudes of inputs and/or feedback related to haptic outputs.

The attractor plate 212 may be moveable with respect to the housing 202. The core 222 may be fixed with respect to the housing 202. In some cases, the housing 202 may be coupled or otherwise attached to the frame 262 and/or another component that is fixed with respect to the housing 202.

FIG. 2B additionally illustrates a first gap 258 between the core 222 and the attractor plate 212 and a second gap 260 between the frame 262 and the attractor plate 212. The first gap 258 may be reduced (e.g., made smaller) in response to an attraction force between the attractor plate 212 and the core 222 (e.g., as the attractor plate 212 moves toward the core 222). A reduction of the first gap 258 may correspond to the input structure 206a being raised with respect to the surrounding housing 202.

The second gap 260 may be reduced (e.g., made smaller) in response to a user input (e.g., input force) applied to the input structure 206a. The user input may depress the input structure 206a, with respect to the housing 202, and may move the attractor plate 212 closer to the frame 262.

Notably, the first gap 258 and the second gap 260 are arranged such that forces imparted on the input structure 206a in perpendicular directions affect the gaps in opposite manners. For example, a downward force imparted on the input structure 206a would decrease the second gap 260 but would increase the first gap 258. Similarly, an upward force imparted on the input structure 206a would increase the second gap 260 but would decrease the first gap 258.

One or more connectors 250a/250b/250c may additionally be provided to receive and/or provide electrical signals to a number of components, such as the core 222 and sensors within the flexible support members 218a/218b.

FIG. 2B illustrates the reluctance haptic engine 201 in an unactuated configuration in which the attractor plate 212 and the core 222 are spaced apart by a first gap 258. The flexible support members 218a/218b and/or the spacers 216a/216b may maintain the first gap 258 between the attractor plate 212 and the core 222.

FIG. 2C illustrates the reluctance haptic engine 201 in an actuated configuration in which the first gap 258 between the attractor plate 212 and the core 222 is reduced or eliminated. In addition, the second gap 260 is made larger as the attractor plate 212 moves away from the frame 262. The reluctance haptic engine 201 may actuate (e.g., transition from an unactuated configuration to an actuated configuration) in response to a reluctance force generated within the reluctance haptic engine and/or in response to a force applied to the reluctance haptic engine, such as by a user input on the input structure 206a. As shown in FIGS. 2B-2C, the core 222 may be fixed with respect to a frame 262 and/or the housing 202, and the attractor plate 212 may move toward the core 222 as the reluctance haptic engine 201 actuates. In some cases, the attractor plate 212 contacts the core 222 in an actuated configuration. In some cases, the attractor plate 212 does not contact the core 222 in an actuated configuration. Actuation of the reluctance haptic engine 201 may produce a haptic output or a portion thereof. The haptic output may be a localized haptic output along at least a portion of the input surface 208a of the input structure 206a and/or a global haptic output along a larger portion or a substantial entirety of the housing 202.

As noted above, the flexible support members 218a/218b may deform as the reluctance haptic engine 201 actuates (e.g., as the attractor plate 212 moves toward the core 222). When the reluctance force is reduced or ceased (e.g., when the electrical currents applied to the conduction loops 224 are reduced or ceased) or when the input force is reduced or ceased, the biasing force of the flexible support members 218a/218b may overcome the reluctance force and/or the input force and cause the biasing members to transition from a deformed state to the non-deformed state (or from a deformed state to a less-deformed state), thereby displacing the core 222 away from the attractor plate 212 and/or reestablishing the first gap 258. Displacing the attractor plate 212 away from the core 222 may produce a haptic output or a portion thereof, similar to actuation of the reluctance haptic engine 101 discussed above.

Similar to the reluctance haptic engine 101, the flexible support members 218a/218b may include one or more sensing elements that may be used to sense actuation based on measuring deflection and/or deformation of the flexible support members. As noted above, the flexible support members 218a/218b may deflect or deform in response to actuation of the reluctance haptic engine 201, for example by a user input and/or a reluctance force. The sensing elements may include one or more sensors (e.g., strain sensors) positioned along the flexible support members 218a/218b and configured to output a signal that varies based on the deflection and/or deformation of the flexible support members.

The core 222 and/or the conduction loop 224 may be communicably coupled to a processing unit or other circuitry of the electronic device 200 via a connector 250b. In some cases, the connector 250b may be or include one or more traces in a flex or other cable. In some cases, multiple connectors may be incorporated into a single flex or cable.

The flexible support members 218a/218b may be communicably coupled to a processing unit or other circuitry of the electronic device 200 via connectors 250a/250c. In some cases, the connectors 250a/250c may be or include one or more traces in a flex or other cable. In some cases, multiple connectors may be incorporated into a single flex or cable.

Figure 3A:
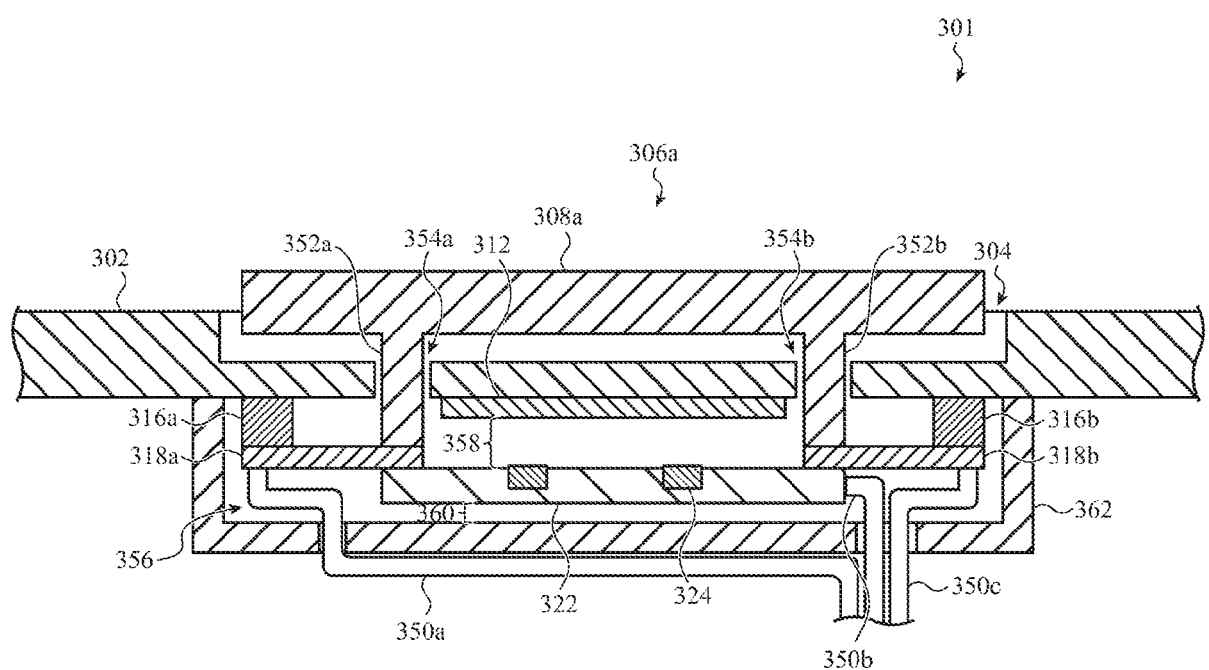
FIGS. 3A-3B illustrate partial cross-section views of an electronic device that may incorporate a reluctance haptic engine with flexible support members and having a moveable core comprising one or more conduction loops, as described herein.
Figure 3B:
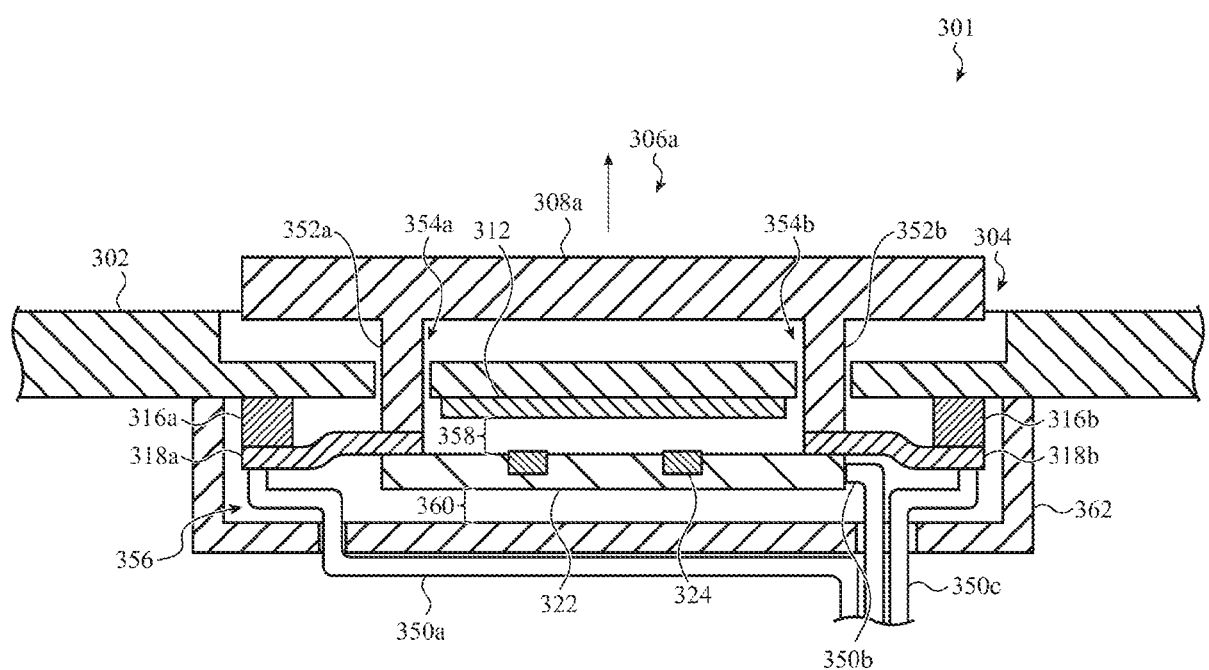

Even though in FIGS. 2B-2C the attractor plate 212 is shown as moveable with respect to the frame 262 and/or the housing 202 and the core 222 is shown as fixed relative to the frame 262 and/or the housing 202, in various embodiments within the scope of this disclosure, the core 222 may be moveable relative to the frame 262 and/or the housing 202 and the attractor plate 212 may be fixed relative to the frame 262 and/or the housing 202 (e.g., as depicted in FIGS. 3A-3B).

The reluctance haptic engine 201 of FIGS. 2B-2C may translate the input structure 206a along a path that is opposite from the input surface 208a (e.g., up and down with respect to FIGS. 2B-2C). In various embodiments, reluctance haptic engines may be configured to move input structures in different directions or in multiple directions. As depicted in FIGS. 2B-2C, an input applied to the input structure 206a may be opposite to a reluctance force imparted to the input structure 206a by the reluctance haptic engine 201.

Though the reluctance haptic engine 201 is discussed with respect to the input structure 206a, in alternate or additional embodiments the input structure 206b may be provided with a reluctance haptic engine.

FIGS. 3A-3B illustrate partial cross-section views of a reluctance haptic engine 301. The embodiment illustrated in FIGS. 3A-3B may have substantially similar components as discussed with respect to the reluctance haptic engine 201 as described with respect to FIGS. 2A-2C and duplicative description is omitted for clarity. FIG. 3A illustrates an unactuated state and FIG. 3B illustrates an actuated state where a coil 322 moves closer to an attractor plate 312.

The reluctance haptic engine 301 is substantially similar to the reluctance haptic engine 201. However, instead of a moveable attractor plate (e.g., attractor plate 212) and an immoveable core (e.g., core 222), the reluctance haptic engine 301 may implement a moveable core 322 and an immoveable attractor plate 312. The core 322 may be moveable with respect to the housing 302. The attractor plate 312 may be fixed with respect to the housing 302. In some cases, the housing 302 may be coupled or otherwise attached to the frame 362 and/or another component that is fixed with respect to the housing 302.

In an unactuated state, a first gap 358 may be provided between the core 322 and the attractor plate 312. One or more conduction loops 324 of the core 322 may be periodically activated (e.g., in response to an electrical signal) and may cause the core 322 to move toward the attractor plate 312, thereby reducing or eliminating the first gap 358. As discussed with respect to FIGS. 2A-2C, the flexible support members 318a/318b may deform as the core 322 is attracted toward the attractor plate 312 and may cause an input structure 306a to move upwards. The activation of the one or more conduction loops 324 may be referenced as an actuated state.

As the core 322 moves toward the attractor plate 312, thereby reducing/eliminating the first gap 358, a second gap 360 between the core 322 and the frame 362 may be increased. Conversely, a force applied to the input structure 306a may increase the first gap 358 and may reduce/eliminate the second gap 360. As a haptic force provided by the attraction between the core 322 and the attractor plate 312 opposes an input force applied to an input surface 308a of the input structure 306a, a need to account for both the input and haptic force in an additive manner may be eliminated, reducing a bottom-out risk of the reluctance haptic engine 301.

FIGS. 4A-4E illustrate an example reluctance haptic engine 401 as may be implemented with respect to an input region operable to receive touch inputs from a user. For example, the reluctance haptic engine 401 may be provided within a touch bar configured to receive user inputs along the touch bar.

The reluctance haptic engine 401 may include a top plate 402, a core 422, a coil (e.g., conduction loops) 424, a first button element 408a, a second button element 408b, a first stool 464a, a second stool 464b, a first spacer 416a, a second spacer 416b, a first flexible support member 418a, and a second flexible support member 418b. Dimensions of the reluctance haptic engine 401 are not particularly limited and may, in some implementations, correspond to a length between 10 mm and 500 mm and a width between 3 mm and 50 mm.

The first button element 408a and the second button element 408b may be moveable with respect to certain elements of the reluctance haptic engine 401 (e.g., the first stool 464a, the second stool 464b, and the core 422). Operations of the reluctance haptic engine 401 are discussed with respect to FIGS. 4B-4E. Aspects of the reluctance haptic engine 401, such as materials, may be similar to corresponding elements discussed with respect to FIGS. 1A-3B and duplicative description is omitted for clarity.

Figure 4A:
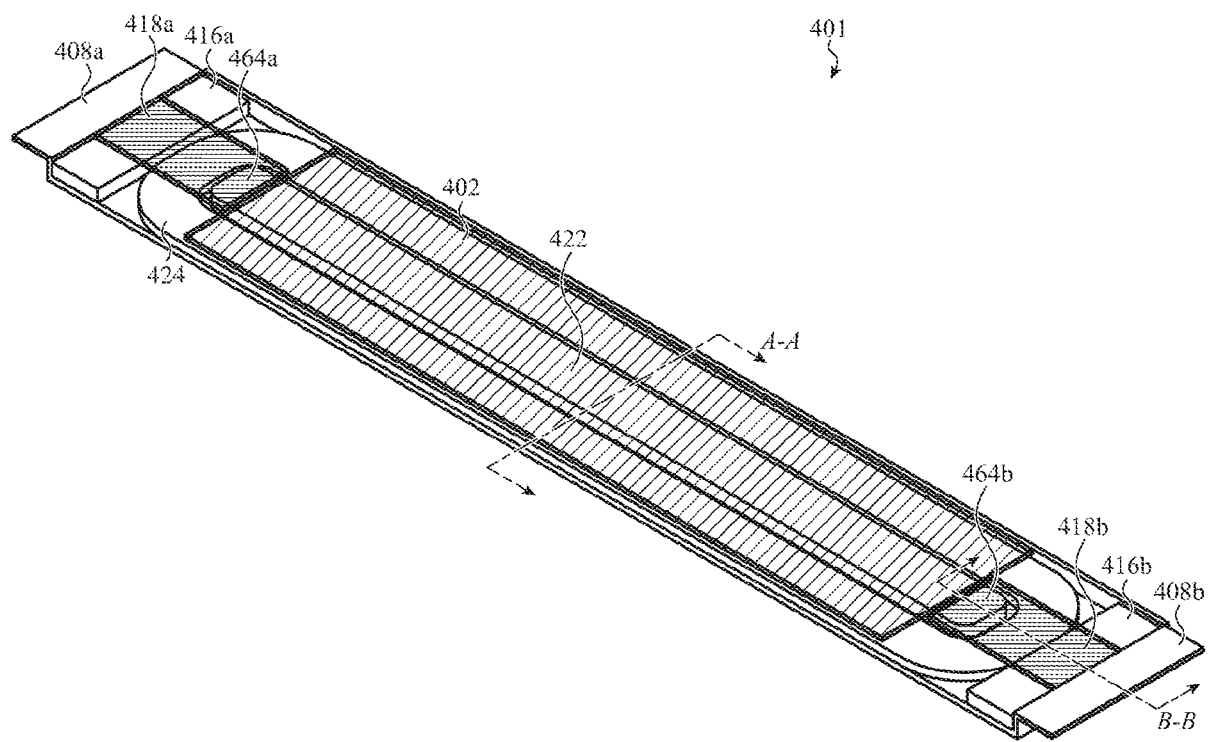
FIGS. 4A-4E illustrate an example reluctance haptic engine as may be implemented with respect to an input region operable to receive touch inputs from a user, as described herein.
Figure 4B:
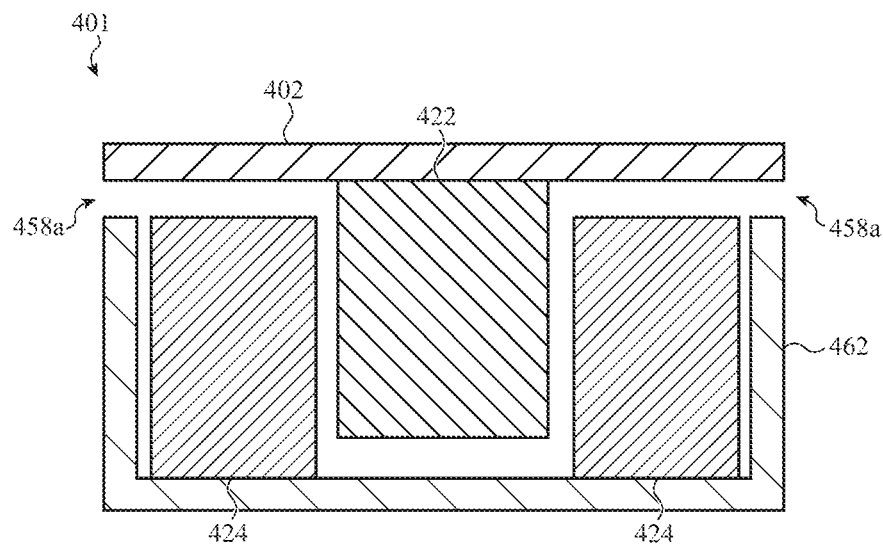
Figure 4C:
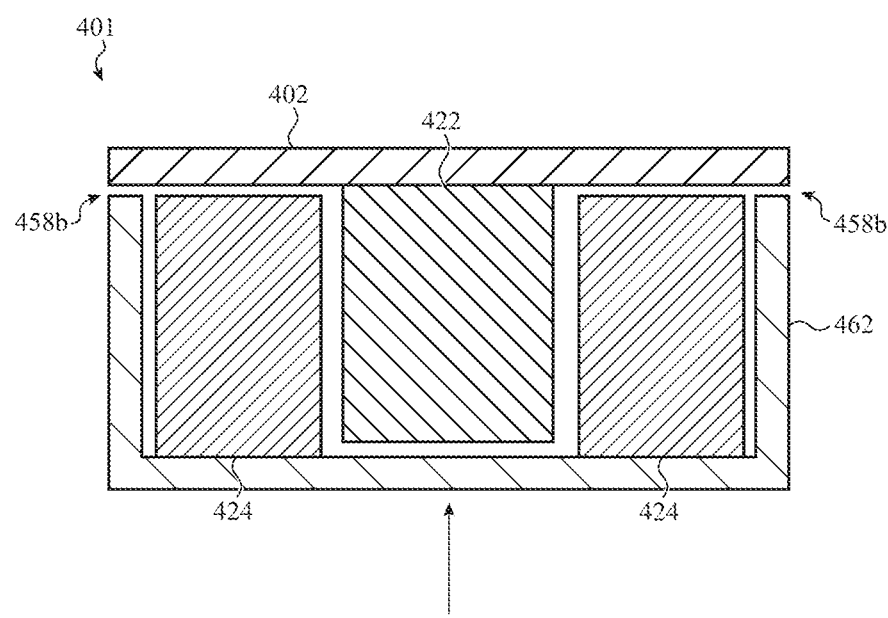

FIGS. 4B-4C illustrate a cross-sectional view of the reluctance haptic engine 401 across line A-A (e.g., near a central portion of the reluctance haptic engine 401). As depicted in FIG. 4B, a core 422 may be coupled to a top plate 402 and may be configured as a central beam. The core 422 and the top plate 402 may be spaced from a bottom frame 462 by gaps 458a. The bottom frame 462 may include a coil 424 affixed to a bottom portion thereof. As illustrated in FIGS. 4B-4C, the coil 424 is depicted as two parts. However, with reference to FIG. 4A, the coil 424 may have an ovaloid shape extending around an area defined by the core 422.

The reluctance haptic engine 401 as depicted in FIG. 4B illustrates an unactuated state where the coil 424 is not attracted toward the core 422 and/or the top plate 402. FIG. 4C illustrates the reluctance haptic engine 401 in an actuated state where the coil 424 is moved toward the core 422 and/or the top plate 402 due to magnetic forces, as discussed above. As the coil 424 moves toward the core 422 and/or top plate 402, the gaps 458a may be reduced or eliminated (e.g., as gaps 458b). In this way, the bottom frame 462 may move upwards with respect to the core 422 and/or top plate 402.

Figure 4D:
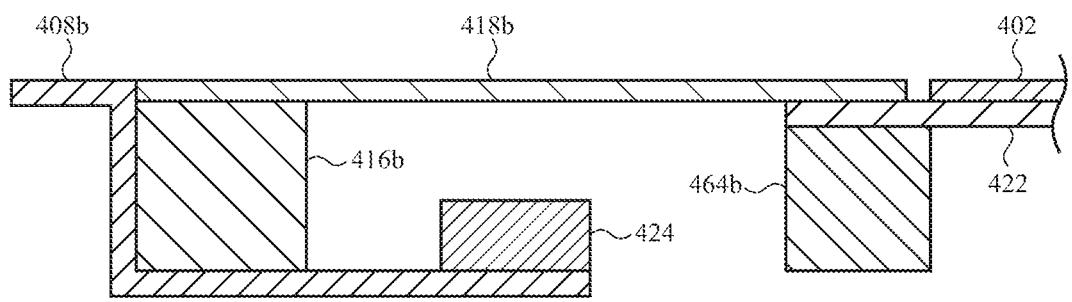
Figure 4E:
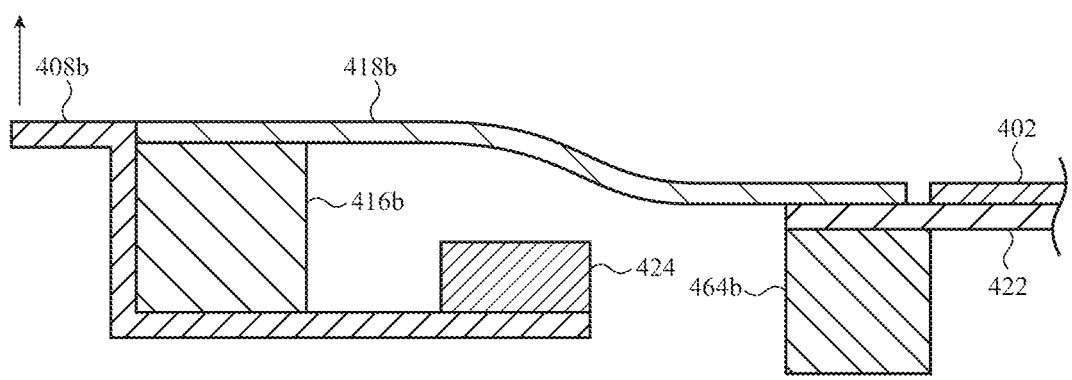

FIGS. 4D-4E illustrate a partial cross-sectional view across line B-B as depicted in FIG. 4A. FIG. 4D generally corresponds to an unactuated state (e.g., the state depicted in FIG. 4B) and FIG. 4E generally corresponds to an actuated state (e.g., the state depicted in FIG. 4C).

As depicted in FIG. 4D, a second button element 408b may be coupled to a portion of a coil 424. A second spacer 416b may additionally be provided on the second button element 408b and the second spacer 416b may couple the second flexible element 418b to the second button element 408b. The second flexible element 418b may further be coupled to the core 422 and/or the second stool 464b. When the coil 424 moves toward the top plate 402 and/or the core 422, the second button element 408 may move upwards (e.g., an actuated state as depicted in FIG. 4E) with respect to the second stool 464b, thereby causing the second flexible element 418b to deform. Through this arrangement, an upward force may be provided to a user of the second button element 408*b*.

Though the cross section B-B is taken across the second button element 408*b*, it is noted that a structure of the first button element 408*a*, and associated components thereof, may be substantially similar. Additionally, the second button element 408*b* and the first button element 408*a* may be operated in tandem and/or may be operated individually (e.g., if multiple coils are provided within the reluctance haptic engine 401.

In various embodiments, reluctance haptic engines may be configured to move input structures in different directions or in multiple directions. A reluctance haptic engine 500 may include multiple coils and/or actuators configured to move an input structure in multiple directions. For example, any number of the embodiments shown in FIGS. 1A-4E may be combined to move an input surface laterally and/or in and out with respect to an enclosure.

Figure 5:
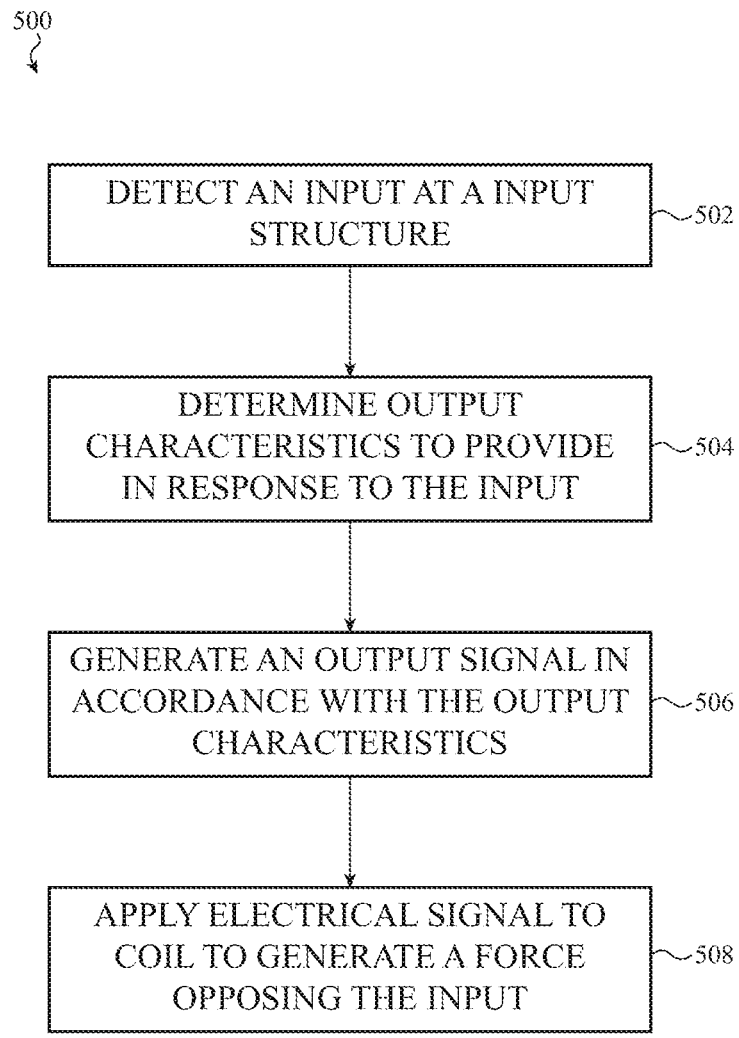
FIG. 5 depicts a flowchart of an example method for producing a haptic output at an electronic device using a reluctance haptic engine with flexible support members, as described herein.

FIG. 5 depicts a flowchart of an example method 500 for producing a haptic output at an electronic device using a reluctance haptic engine with flexible support members. At operation 502, the electronic device detects an input at the electronic device. For example, the input may be an input to a button or other input structure. As another example, the input may be a rotational input at a crown detected by sensing rotational movement of the crown. As still another example, the input may be a touch input detected along a touch-sensitive display. In some cases, the processing unit may determine whether the input force exceeds a threshold level of movement (e.g., a threshold level of rotational movement, a threshold level of translation, etc.) In some cases, the method only proceeds if an input force of the input exceeds the threshold level of force.

At operation 504, the processing unit determines output characteristics to be produced by the electronic device in response to the input received at operation 502. In some cases, the output characteristics correspond to one or more characteristics of the input detected at operation 502. For example, the associated output characteristics may correspond to a force of the input, a location of the input, a rotational speed or position of the crown, an output associated with a rotational input, a user interface command associated with the user input, and so on. The processing unit may determine one or more characteristics of the input to determine the output characteristics.

In some cases, determining the output characteristics at operation 504 may include determining a strength, length, or other characteristics of a haptic output to be produced. For example, the processing unit may determine whether to provide a localized haptic output or a global haptic output based, at least in part, on a characteristic of the input.

At operation 506, the processing unit outputs an output signal to provide a haptic output that corresponds to the output characteristics determined at operation 504. The output signal may be transmitted to a reluctance haptic engine of the electronic device to direct the reluctance haptic engine to produce the haptic output.

At operation 508, in response to receiving the output signal from the processing unit, the electronic device applies electrical current to conduction loops of a reluctance haptic engine to cause the reluctance haptic engine to actuate (e.g., move from an unactuated configuration to an actuated configuration). In particular, the force generated at operation 508 may oppose the input received at operation 502. In some cases, actuation of one or more reluctance haptic engines produces a first portion of the haptic output, for example by causing an input structure to move. As noted above, a gap between an attractor plate and a core of the reluctance haptic engine may be reduced or closed (e.g., the attractor plate may move toward the core and/or the core may move toward the attractor plate), thereby moving an input structure coupled to the attractor plate or the core (e.g., along a path that is parallel to an input surface of the input structure, along a path that is perpendicular to the input surface, or along a different path).

In some cases, following actuation of the reluctance haptic engine, the electrical current may be ceased, reduced, or otherwise changed, which causes the reluctance haptic engine to be restored (either partially or fully) to its initial configuration (e.g., to reestablish a gap between an attractor and one or more cores). As noted above, a gap between an attractor plate and a core of the reluctance haptic engine may be increased or restored (e.g., the attractor plate may move away from the core and/or the core may move away from the attractor plate), thereby moving an input structure coupled to the attractor plate or the core (e.g., along a path that is parallel to an input surface of the input structure, along a path that is perpendicular to the input surface, or along a different path).

In some cases, one or more reluctance haptic engines being restored produces a second portion of the haptic output, for example by causing the input structure to move. As noted above, in some cases, flexible support members of the reluctance haptic engine at least partially cause the restoration of the reluctance haptic engine, for example by applying a biasing force to move the attractor plate and/or the core(s) to an initial position.

In some cases, the reluctance haptic engine being restored may prepare the reluctance haptic engine for a subsequent actuation. In various embodiments, once the reluctance haptic engine has been restored (either partially or fully), it may be subsequently actuated by applying additional electrical current to the conduction loops (e.g., in response to receiving another output signal from the processing unit) to provide a third portion of the haptic output. The reluctance haptic engine may be subsequently restored (either partially or fully) to its initial configuration (either partially or fully), which may provide a fourth portion of the haptic output. Actuation and restoration may be repeated to repeatedly move the input structure in alternating directions to produce one or more haptic outputs and/or portions thereof.

The method 500 is an example method for providing haptic outputs and is not limiting. Methods for providing haptic outputs may omit and/or add steps to the method 500. Similarly, steps of the method 500 may be performed in different orders than the example order discussed above. The method 500 refers to providing haptic outputs in response to an input, but this is just one example. Haptic outputs may also be provided in response to a system state, an application operation on a device, a device state (e.g., temperature), application or system alerts (e.g., calendar alerts, notifications, alarms, and the like), incoming communications, push notifications, and so on.

Figure 6:
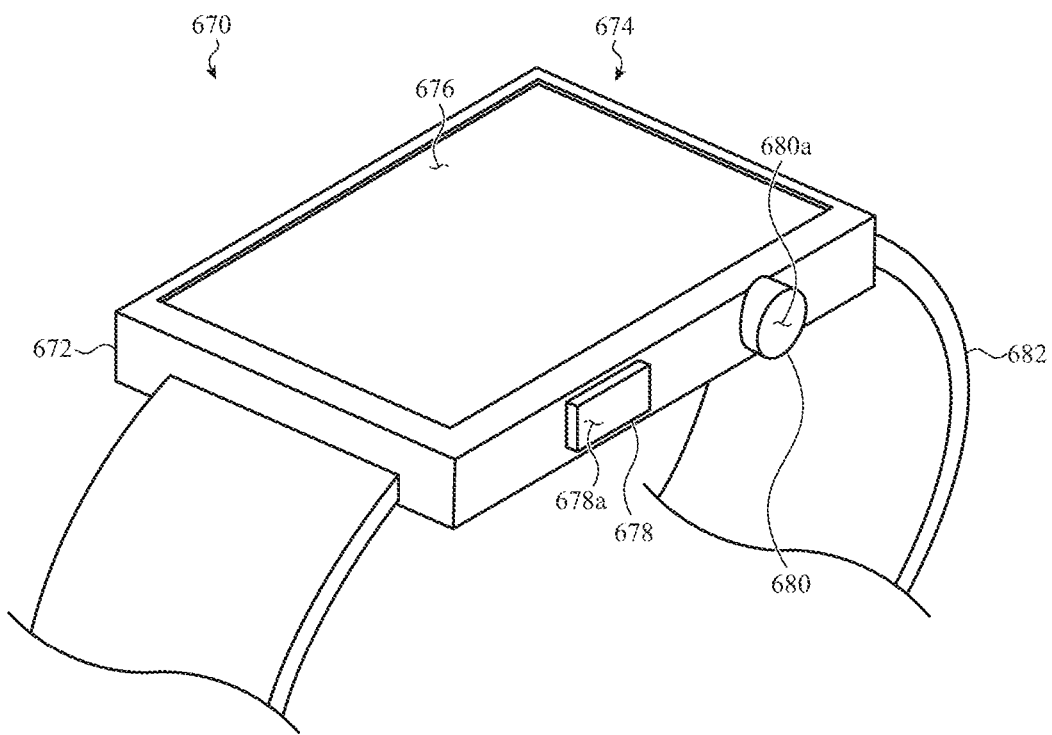
FIG. 6 illustrates an example electronic device, configured as an electronic watch, that may incorporate a reluctance haptic engine with flexible support members, as described herein.

FIG. 6 illustrates an example wearable electronic device 670 that may incorporate a reluctance haptic engine with flexible support members, configured as an electronic watch. The wearable electronic watch 670 is similar to the electronic devices discussed herein, and may include similar features and/or components, including a device housing 672, one or more input structures 678/680 defining one or more input surfaces 678*a*/680*a*, one or more output devices, a display 674 positioned beneath the cover 676, and a processing unit positioned at least partially within the housing 672. The wearable electronic device 670 may additionally include one or more bands 682 configured to couple the wearable electronic device 670 with a body part of a user.

In some cases, the wearable electronic device 670 includes a crown 680 configured to receive translational inputs, rotational inputs, and/or touch inputs. Inputs received at the crown 680 may result in changes in outputs provided by the wearable electronic device 670 such as a graphical output of the display, and/or otherwise modify operations of the wearable electronic device 670. In some cases, the crown 680 may be positioned along a side of the housing 672, and may extend through an opening defined in the housing 672. The crown 680 may include a user-rotatable crown body and a shaft. The crown body may be positioned at least partially outside of the device housing 672 and may be coupled to the shaft. In some cases, the shaft extends from the crown body and extends through the opening defined in the housing 672.

In some cases, the wearable electronic device 670 may include a conductive portion that may be used to perform an electrocardiogram (ECG) measurement. The crown body or another input structure may define a conductive surface for receiving touch inputs. In some cases, the conductive surface functions as an electrode to sense voltages or signals indicative of one or more touch inputs and/or biological parameters, such as an electrocardiogram, of a user in contact with the conductive surface. The housing 672 may define a touch-sensitive or conductive surface that is electrically coupled to the processing unit and also functions as an electrode. The processing unit may determine an ECG using outputs of the electrodes of the crown body and the housing 672. In various embodiments, the crown 680 is electrically isolated from the housing 672, for example to allow separate measurements at the electrodes. In various embodiments, the crown body may be electrically coupled to the processing unit or another circuit of the wearable electronic device 670, for example via a connector and/or the shaft.

Figure 7:
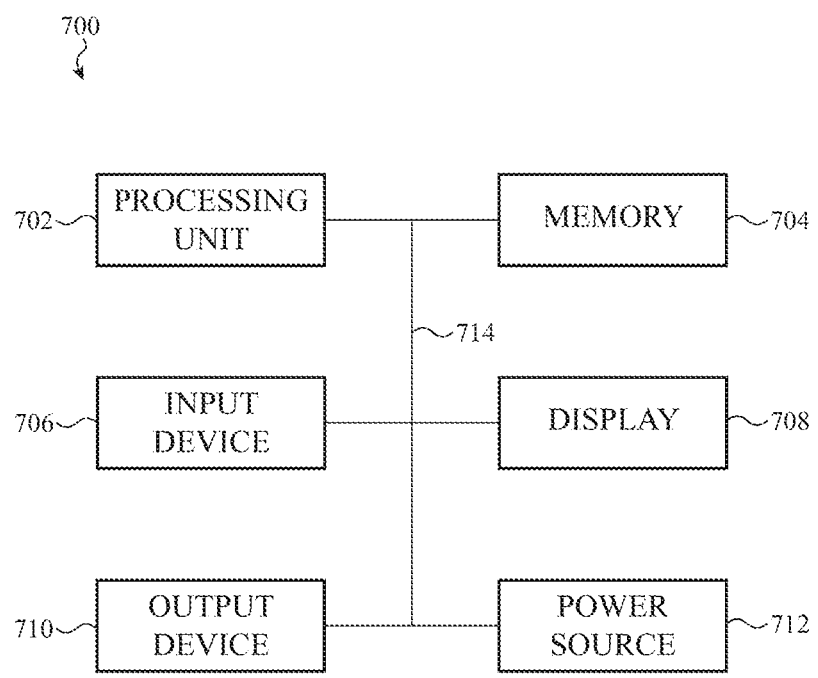
FIG. 7 depicts a sample electrical block diagram of an electronic device that may incorporate a reluctance haptic engine, as described herein.

FIG. 7 illustrates a sample electrical block diagram of an electronic device 700 that may incorporate a reluctance haptic engine. The electronic device may in some cases take the form of any of the electronic devices described with reference to FIGS. 1A-6, or other portable or wearable electronic devices. The electronic device 700 can include a display 708 (e.g., a light-emitting display), a processing unit 702, a power source 712, a memory 704 or storage device, an input device 706 (e.g., a crown, a button), and an output device 710 (e.g., a reluctance haptic engine).

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 708) may be controlled by a second processing unit, where the first and second processing units may or may not be in communication with each other. In some cases, the processing unit 702 may determine a biological parameter of a user of the electronic device, such as an ECG for the user.

The power source 712 can be implemented with any device capable of providing energy to the electronic device 700. For example, the power source 712 may be one or more batteries or rechargeable batteries. Additionally or alternatively, the power source 712 can be a power connector or power cord that connects the electronic device 700 to another power source, such as a wall outlet.

The memory 704 can store electronic data that can be used by the electronic device 700. For example, the memory 704 can store electrical data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example associated with an operating system, user interface, and/or applications of the electronic device 700. In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor)

integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, BLUETOOTH, infrared, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   a housing defining an opening;
   an input structure positioned at least partially within the opening and moveable with respect to the housing, the input structure defining an input surface;
   a reluctance haptic engine positioned beneath the input structure and comprising:
      a core affixed to a bottom surface of the housing and comprising a conduction loop operable to receive an electrical signal;
      an attractor plate separated from the core by a first gap and separated from a frame coupled to the housing by a second gap; and
      a mechanical suspension coupling the attractor plate to the input structure and securing the attractor plate and the input structure to the housing; and
   a processor configured to cause the core to generate a reluctance force by providing the electrical signal to the conduction loop, the generation of the reluctance force causing the attractor plate to move toward the core, thereby deforming the mechanical suspension, reducing the first gap between the attractor plate and the core, increasing the second gap between the attractor plate and the frame, and applying the reluctance force to the input structure.

2. The electronic device of claim 1, wherein:
   the mechanical suspension comprises a sensing element that detects an input applied to the input structure; and
   the processor provides the electrical signal to the conduction loop in response to the detection of an input force.

3. The electronic device of claim 2, wherein:
   the input comprises the input force that is applied to the input structure in a first direction;
   the reluctance force is applied to the input structure in a second direction; and
   the first direction is opposite from the second direction.

4. The electronic device of claim 1, wherein the reluctance force extends the input structure above the housing.

5. The electronic device of claim 1, further comprising one or more spacers coupling the mechanical suspension to the housing, wherein the input structure further defines one or more support structures that extend through the housing and couple with the mechanical suspension.

6. The electronic device of claim 1, wherein, in response to an input applied to the input structure:
   the first gap between the attractor plate and the core increases; and
   the second gap between the attractor plate and the frame decreases.

7. The electronic device of claim 6, wherein, in response to the reluctance force being applied subsequent to the input, the reluctance force causes:
   the first gap between the attractor plate and the core to decrease; and
   the second gap between the attractor plate and the frame to increase.

8. The electronic device of claim 7, wherein:
   the electronic device is a laptop computer; and
   the input structure is a touch strip of the laptop computer.

9. An electronic device comprising:
   a housing;
   a display positioned at least partially within the housing;
   an input structure positioned at least partially within the housing; and
   a reluctance haptic engine positioned below the input structure and comprising:
      an attractor plate coupled to the housing; and
      a core comprising a conduction loop and coupled to the input structure, the core separated from the attractor plate by a gap and configured to move toward the attractor plate in response to a reluctance force produced during an actuated state, thereby raising the input structure above the housing.

10. The electronic device of claim 9, wherein the actuated state is engaged when the conduction loop of the core receives an electrical signal.

11. The electronic device of claim 9, further comprising one or more flexible members coupling the input structure to the housing and to the core.

12. The electronic device of claim 11, wherein the one or more flexible members deform when the actuated state is engaged.

13. The electronic device of claim 9, further comprising a frame extending beneath the reluctance haptic engine, wherein:
   the gap between the attractor plate and the core is a first gap; and the core is separated from the frame by a second gap.

14. The electronic device of claim 13, wherein, when an input is applied to the input structure:
the first gap between the attractor plate and the core increases; and
the second gap between the core and the frame decreases.

15. The electronic device of claim 13, wherein, in response to the reluctance force being produced during the actuated state:
the first gap between the attractor plate and the core decreases; and
the second gap between the core and the frame increases.

16. The electronic device of claim 9, wherein a user input applied to the input structure moves the core in a first direction opposite from a second direction that the core moves in response to the reluctance force.

17. A method of producing a haptic output at an electronic device, the method comprising:
detecting an input at an input structure;
determining, in response to detecting the input, output characteristics of the haptic output to be generated by a reluctance haptic engine;
generating an output signal corresponding to the determined output characteristics; and
applying an electrical signal to a core of the reluctance haptic engine to generate a reluctance force, the reluctance force opposing the input.

18. The method of claim 17, wherein the output characteristics include at least one of a force value of the reluctance force, a location of the reluctance force, or a rotational speed associated with the reluctance force.

19. The method of claim 17, wherein detecting the input at the input structure comprises detecting one of a force value, an intensity, or a location of the input.

20. The method of claim 17, wherein the haptic output is a local haptic output applied to the input structure.

* * * * *